US012374828B2

(12) United States Patent
Campbell et al.

(10) Patent No.: US 12,374,828 B2
(45) Date of Patent: Jul. 29, 2025

(54) SELF-ALIGNING MATE ASSURANCE MODULAR DOCKING ELECTRICAL CONNECTOR SYSTEM

(71) Applicant: APTIV TECHNOLOGIES LIMITED, St. Michael (BB)

(72) Inventors: Jeffrey S. Campbell, West Bloomfield, MI (US); Wesley W. Weber, Lapeer, MI (US)

(73) Assignee: APTIV TECHNOLOGIES AG, Schaffhausen (CH)

(*) Notice: Subject to any disclaimer, the term of this patent is extended or adjusted under 35 U.S.C. 154(b) by 327 days.

(21) Appl. No.: 17/747,705

(22) Filed: May 18, 2022

(65) Prior Publication Data

US 2022/0376436 A1 Nov. 24, 2022

Related U.S. Application Data

(60) Provisional application No. 63/190,894, filed on May 20, 2021, provisional application No. 63/217,410, (Continued)

(51) Int. Cl.
*H01R 13/631* (2006.01)
*H01R 12/77* (2011.01)
(Continued)

(52) U.S. Cl.
CPC ....... *H01R 13/6315* (2013.01); *H01R 12/771* (2013.01); *H01R 13/502* (2013.01); (Continued)

(58) Field of Classification Search
CPC .............. H01R 13/6315; H01R 13/502; H01R 13/5202; H01R 12/771; H01R 43/26; H01R 2201/26
(Continued)

(56) References Cited

U.S. PATENT DOCUMENTS 4,537,458 A * 8/1985 Worth ................ H01R 13/6584 439/497
4,776,803 A * 10/1988 Pretchel ............... H01R 12/675 249/97
(Continued)

FOREIGN PATENT DOCUMENTS

CN 111725641 A * 9/2020 ........... H01R 12/771
EP 0901197 A2 3/1999
(Continued)

OTHER PUBLICATIONS

European Search Report for EP22174634 dated Jan. 26, 2023, 9 pages.

*Primary Examiner* — Gary F Paumen
(74) *Attorney, Agent, or Firm* — Miller Johnson

(57) ABSTRACT

Self-aligning mounting systems and methods for an electrical connectors and controllers of an electrified vehicle include a dock member configured to be fixedly attached to a frame of the electrified vehicle and to at least temporarily secure the electrical controller therein and at least one floating electrical connector floatably mateable with the dock member such that the floating electrical connector is movable by a tolerance distance amount along each of at least first and second perpendicular axes that are each parallel to the base portion of the dock member, and configured to, during securement of the electrical controller within the dock member along a third axis perpendicular to the first and second axes, electrically connect a first connection portion of the floating electrical connector to a corresponding other electrical connector, such as an inline electrical connector or an electrical connector in a bottom surface of the electrical controller housing.

18 Claims, 23 Drawing Sheets

Related U.S. Application Data filed on Jul. 1, 2021, provisional application No. 63/217,865, filed on Jul. 2, 2021.

(51) Int. Cl.
*H01R 13/502* (2006.01)
*H01R 13/52* (2006.01)
*H01R 43/26* (2006.01)

(52) U.S. Cl.
CPC ......... *H01R 13/5202* (2013.01); *H01R 43/26* (2013.01); *H01R 2201/26* (2013.01)

(58) Field of Classification Search
USPC ................................. 439/247, 248, 492–499
See application file for complete search history.

(56) References Cited

U.S. PATENT DOCUMENTS

| | | | | | | |
|---|---|---|---|---|---|---|
| 4,780,090 | A | * | 10/1988 | Sugiyama | H01R 13/631 | 439/247 |
| 4,909,748 | A | * | 3/1990 | Kozono | H01R 13/6315 | 439/247 |
| 4,959,030 | A | * | 9/1990 | Tatebe | H01R 13/56 | 439/493 |
| 5,007,858 | A | * | 4/1991 | Daly | H01R 12/772 | 439/291 |
| 5,472,348 | A | * | 12/1995 | Daly | H01R 13/6658 | 439/76.1 |
| 6,027,360 | A | * | 2/2000 | Jenkins | H01R 13/6215 | 439/364 |
| 6,755,691 | B2 | * | 6/2004 | Sasame | H01R 12/7029 | 439/246 |
| 7,063,560 | B2 | * | 6/2006 | Asao | H01R 12/774 | 439/496 |
| 7,635,274 | B2 | * | 12/2009 | Fukazawa | H01R 12/716 | 439/74 |
| 7,892,001 | B2 | * | 2/2011 | Hanyu | H01R 12/716 | 439/247 |
| 8,210,867 | B2 | * | 7/2012 | Kojima | H01R 12/598 | 439/83 |
| 2006/0270274 | A1 | * | 11/2006 | Li | H01R 13/6582 | 439/581 |
| 2011/0294326 | A1 | * | 12/2011 | Tanaka | H01R 13/6315 | 439/248 |

FOREIGN PATENT DOCUMENTS

| | | | |
|---|---|---|---|
| WO | 2006103204 | A1 | 10/2006 |
| WO | 2013119526 | A1 | 8/2013 |

* cited by examiner

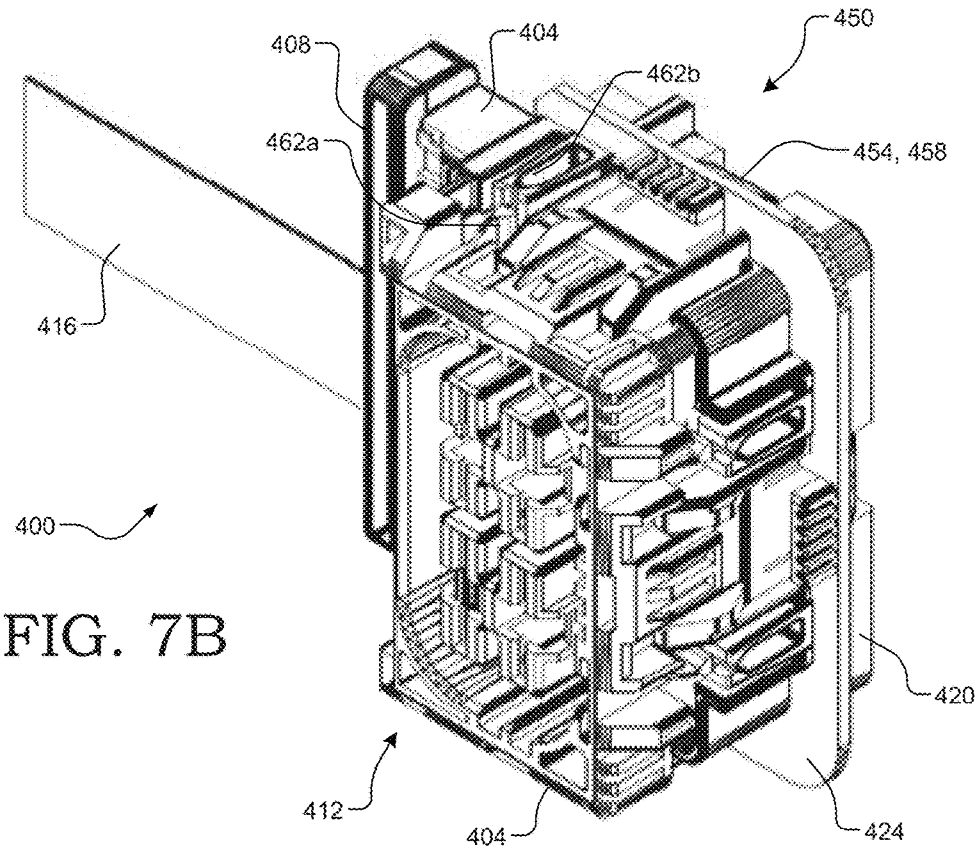
FIG. 7B
FIG. 7C
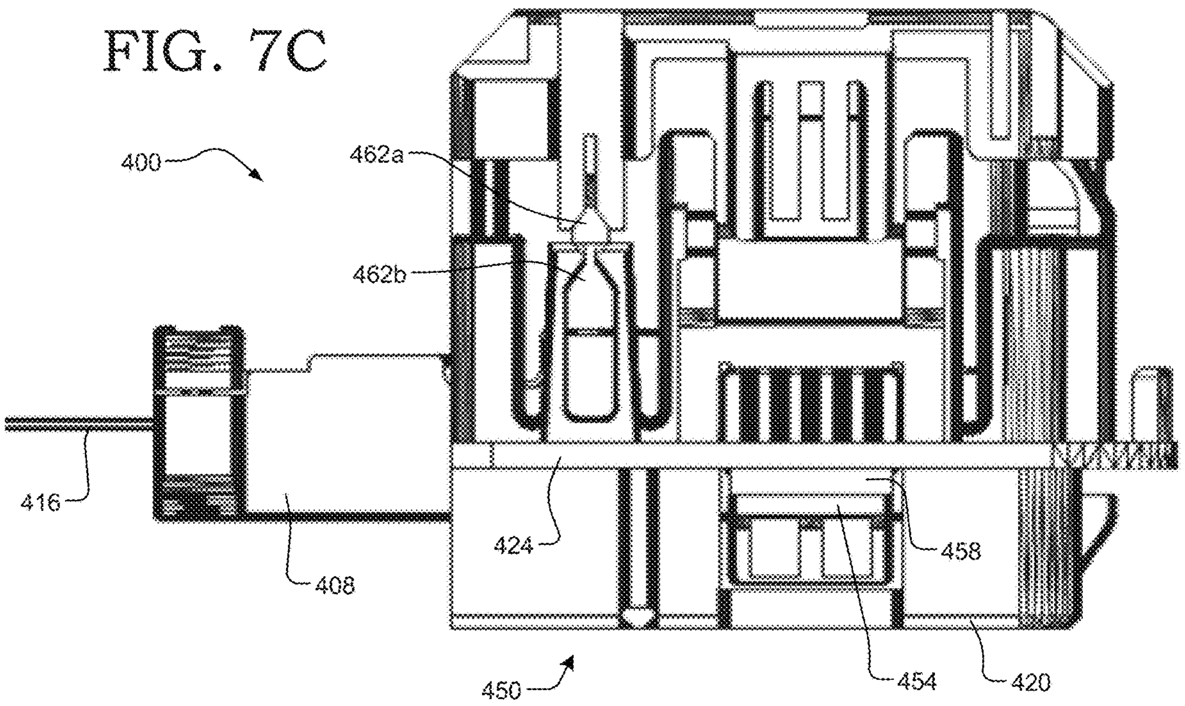

SELF-ALIGNING MATE ASSURANCE MODULAR DOCKING ELECTRICAL CONNECTOR SYSTEM

CROSS-REFERENCE TO RELATED APPLICATIONS

The present application claims the benefit of U.S. Provisional Application Nos. 63/190,894, filed on May 20, 2021, 63/217,410, filed on Jul. 1, 2021, and 63/217,865, filed on Jul. 2, 2021. The disclosures of the above-identified applications are incorporated herein by reference in their entirety.

FIELD

The present disclosure generally relates to a self-aligning mate assurance modular docking electrical connector system.

BACKGROUND

Electrified vehicles typically comprise complex electrical systems. One reason for this is that different components having different power requirements. For example, the electrical system could comprise a plurality of electrical subsystems each operating at a different voltage. For example, low voltage components, such as functional devices and sensors, could operate at 12 volts, whereas propulsion systems, such as electric motors, could operate at hundreds of voltages (e.g., 400+ volts). In addition, there are typically one or more controller(s) controlling input/output of the various components of the electrified vehicle. These controllers, could include primary and sub-controllers separated into physical zones. The result is a large, complex electrical system that increases vehicle costs and weight and decreases vehicle packaging availability, while also being very difficult for a human or a robot to install/modify.

Therefore, for practical assembly and service, automotive electrical systems can utilize separable electrical connection systems. The separable connection systems form electrical connections between different types of metal conductor elements, typically wire-to-wire connections and wire-to-device connections. These separable electrical connectors have multiple cavities which retain conductive metal terminals, that usually are crimped to stranded wire. The mating of automotive electrical connection systems requires labor intensive manual assembly. These connector systems are designed with manual assembly feedback features that are not suitable for reliable automated robotic assembly, and also prone to mis-mating when manually assembled. Thus, while these conventional electrical systems work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, A self-aligning mounting system for an electrical controller of an electrified vehicle is presented. In one exemplary implementation, the self-aligning mounting system comprises a dock member defining a base portion and four side portions and configured to be fixedly attached to a frame of the electrified vehicle and to at least temporarily secure the electrical controller therein, and at least one floating electrical connector floatably mateable with the dock member such that the floating electrical connector is movable by a tolerance distance amount along each of at least first and second perpendicular axes that are each parallel to the base portion of the dock member, and configured to, during securement of the electrical controller within the dock member along a third axis perpendicular to the first and second axes, electrically connect a first connection portion of the floating electrical connector to a corresponding electrical connector defined in a bottom surface of a housing of the electrical controller.

In some implementations, each floating electrical connector defines a second connection portion that receives at least one flexible circuit (FC) arranged approximately parallel to the dock member base portion, and wherein the second connection portion is arranged approximately perpendicular to the dock member base portion. In some implementations, at least one second connection portion of at least one floating electrical connector receives a plurality of FCs in a stacked configuration. In some implementations, each floating electrical connector defines a base housing member and a cap member configured to selectively engage/disengage with the base housing member via a set of connection position assurance (CPA) features. In some implementations, each floating electrical connector further comprises at least one seal or retaining member arranged between the cap member and the base housing member.

In some implementations, the dock member base portion and one dock member side portion define at least one gap portion each defining at least one recessed tab structure, wherein the at least one gap portion is configured to receive the at least one floating electrical connector and the cap member of the at least one floating electrical connector is configured to interact with the at least one recessed tab structure. In some implementations, each cap member defines a cap member area that is less than an area of the gap portion to thereby allow the floating electrical connector to be movable by the tolerance distance amount along each of at least first and second perpendicular axes. In some implementations, the dock member provides for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector.

In some implementations, the at least one floating electrical connector comprises distinct first and second floating electrical connectors and the dock member base portion and one of the dock member side portions define distinct first and second gap portions each defining at least one recessed tab structure, wherein the first and second gap portions are configured to receive the first and second floating electrical connectors and respective first and second cap members of the first and second floating electrical connector is configured to interact with the respective at least one recessed tab structures. In some implementations, the dock member is formed of sheet metal and the sheet metal dock member further comprises heat sinks or heat transfer materials disposed on an inner portion of its bottom surface to provide for heat management of the electrical controller and the sheet metal dock member.

According to another aspect of the present disclosure, a self-aligning mounting method for an electrical controller of an electrified vehicle is presented. In one exemplary implementation, the self-aligning mounting method comprises providing a dock member defining a base portion and four side portions and configured to be fixedly attached to a frame of the electrified vehicle and to at least temporarily secure the electrical controller therein, providing at least one floating electrical connector floatably mateable with the dock member such that the floating electrical connector is movable by a tolerance distance amount along each of at least first and second perpendicular axes that are each parallel to the base portion of the dock member, and configured to, during securement of the electrical controller within the dock member along a third axis perpendicular to the first and second axes, and securing the electrical controller within the dock member along the third axis including electrically connecting a first connection portion of the floating electrical connector to a corresponding electrical connector defined in a bottom surface of a housing of the electrical controller.

In some implementations, each floating electrical connector defines a second connection portion for receiving at least one flexible circuit (FC) arranged approximately parallel to the dock member base portion, and wherein the second connection portion is arranged approximately perpendicular to the dock member base portion. In some implementations, at least one second connection portion of at least one floating electrical connector receives a plurality of FCs in a stacked configuration. In some implementations, each floating electrical connector defines a base housing member and a cap member configured to selectively engage/disengage with the base housing member via a set of connection position assurance (CPA) features. In some implementations, each floating electrical connector further comprises at least one seal or retaining member arranged between the cap member and the base housing member.

In some implementations, the dock member base portion and one dock member side portion define at least one gap portion each defining at least one recessed tab structure, wherein the at least one gap portion is configured to receive the at least one floating electrical connector and the cap member of the at least one floating electrical connector is configured to interact with the at least one recessed tab structure. In some implementations, each cap member defines a cap member area that is less than an area of the gap portion to thereby allow the floating electrical connector to be movable by the tolerance distance amount along each of at least first and second perpendicular axes. In some implementations, the dock member provides for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector.

In some implementations, the at least one floating electrical connector comprises distinct first and second floating electrical connectors and the dock member base portion and one of the dock member side portions define distinct first and second gap portions each defining at least one recessed tab structure, wherein the first and second gap portions are configured to receive the first and second floating electrical connectors and respective first and second cap members of the first and second floating electrical connector is configured to interact with the respective at least one recessed tab structures. In some implementations, the dock member is formed of sheet metal and the sheet metal dock member further comprises heat sinks or heat transfer materials disposed on an inner portion of its bottom surface to provide for heat management of the electrical controller and the sheet metal dock member.

According to another aspect of the present disclosure, a self-aligning mounting system for an electrical controller of an electrified vehicle is presented. In one exemplary implementation, the self-aligning mounting system comprises a dock member defining a base portion and four side portions and configured to be fixedly attached to a frame of the electrified vehicle and to at least temporarily secure the electrical controller therein, and at least one floating electrical connector floatably mateable with the dock member such that the floating electrical connector is movable by a tolerance distance amount along each of at least first and second perpendicular axes that are each parallel to the base portion of the dock member, and configured to, during securement of the electrical controller within the dock member along a third axis perpendicular to the first and second axes and using dock-controller connection position assurance (CPA) features, electrically connect to a corresponding electrical connector defined in a bottom surface of a housing of the electrical controller.

In some implementations, the dock member and the dock-controller CPA features provide for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector. In some implementations, the dock-controller CPA features comprise an alignment feature defined by one of the four side portions of the dock member and a complimentary alignment feature defined by a side surface of the electrical controller housing that initially contacts and provides for proper positioning of the electrical controller along the first and second axes. In some implementations, the alignment features interact during the securing of the electrical controller within the dock member to guide the electrical controller along the third axis. In some implementations, the dock-controller CPA features further comprise a securement clip defined by the one of the four side portions of the dock member and a complimentary securement recess defined by the side surface of the electrical controller housing that interacts with the securement clip. In some implementations, the securement recess defines a wedge-shaped surface that engages the securement clip to temporarily secure the electrical controller therein the dock member.

In some implementations, the dock-controller CPA features comprise first and second gap areas defined by one of the four side portions of the dock member and having different heights that correspond to two or more side electrical connectors of the electrical controller. In some implementations, the first and second gap areas provide for a relief tolerance between the dock member and the electrical connector during mating. In some implementations, the first gap area defines a first height corresponding to taller first and second side electrical connectors and the second gap area defines a greater second height corresponding to a shorter third side electrical connector. In some implementations, the dock member is formed of sheet metal and the sheet metal dock member further comprises heat sinks or heat transfer materials disposed on an inner portion of its bottom surface to provide for heat management of the electrical controller and the sheet metal dock member.

According to another aspect of the present disclosure, a self-aligning mounting method for an electrical controller of an electrified vehicle is presented. In one exemplary implementation, the self-aligning mounting method comprises providing a dock member defining a base portion and four side portions and configured to be fixedly attached to a frame of the electrified vehicle and to at least temporarily secure the electrical controller therein, providing at least one floating electrical connector floatably mateable with the dock member such that the floating electrical connector is movable by a tolerance distance amount along each of at least first and second perpendicular axes that are each parallel to the base portion of the dock member, and configured to, during securement of the electrical controller within the dock member along a third axis perpendicular to the first and second axes and using dock-controller connection position assurance (CPA) features, and securing the electrical controller within the dock member along the third axis using the dock-controller CPA features including electrically connect to a corresponding electrical connector defined in a bottom surface of a housing of the electrical controller.

In some implementations, the dock member and the dock-controller CPA features provide for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector. In some implementations, the dock-controller CPA features comprise an alignment feature defined by one of the four side portions of the dock member and a complimentary alignment feature defined by a side surface of the electrical controller housing that initially contacts and provides for proper positioning of the electrical controller along the first and second axes. In some implementations, the alignment features interact during the securing of the electrical controller within the dock member to guide the electrical controller along the third axis. In some implementations, the dock-controller CPA features further comprise a securement clip defined by the one of the four side portions of the dock member and a complimentary securement recess defined by the side surface of the electrical controller housing that interacts with the securement clip. In some implementations, the securement recess defines a wedge-shaped surface that engages the securement clip to temporarily secure the electrical controller therein the dock member.

In some implementations, the dock-controller CPA features comprise first and second gap areas defined by one of the four side portions of the dock member and having different heights that correspond to two or more side electrical connectors of the electrical controller. In some implementations, the first and second gap areas provide for a relief tolerance between the dock member and the electrical connector during mating. In some implementations, the first gap area defines a first height corresponding to taller first and second side electrical connectors and the second gap area defines a greater second height corresponding to a shorter third side electrical connector. In some implementations, the dock member is formed of sheet metal and the sheet metal dock member further comprises heat sinks or heat transfer materials disposed on an inner portion of its bottom surface to provide for heat management of the electrical controller and the sheet metal dock member.

According to another aspect of the present disclosure, an electrical connector for connection to another electrical connector of an electrified vehicle is presented. In one exemplary implementation, the electrical connector comprises a terminal housing defining a set of connection position assurance (CPA) features, a cover member configured to selectively engage with the terminal housing and thereby form a first connection portion, a set of flexible circuits (FCs) at least partially disposed within the first connection portion, and a set of terminals each having a first terminal end for electrically contacting a respective FC and a second terminal end exposed via a second connection portion defined by the terminal housing, wherein the other electrical connector is configured to selectively engage with the second connection portion to form an electrical connection therewith via the exposed second terminal ends.

In some implementations, the electrical connector further comprises a flexible seal member configured to seal the second connection portion, and a rigid retainer member configured to secure the flexible seal member therein the second connection portion. In some implementations, each FC further defines an exposed portion for electrically contacting the respective first terminal end, and further comprising an adhesive layer surrounding the FC exposed portion. In some implementations, the set of FCs comprises at least two FCs having their respective first terminal ends offset from each other vertically or horizontally such that the at least two FCs with their exposed portions and their adhesive layers can be arranged in a stacked configuration. In some implementations, the electrical connector is a four-way connector (4WC) having four FCs arranged in a 2×2 configuration. In some implementations, the electrical connector is a ten-way connector (10WC) having ten FCs arranged in a 2×5 or 5×2 configuration.

In some implementations, the other electrical connector is an in-line electrical connector comprising its own set of FCs and arranged approximately parallel with the set of FCs when mated with the electrical connector. In some implementations, the other electrical connector is an electrical connector of an electrical controller of the electrified vehicle. In some implementations, the electrical connector is configured to be floatably mated with a dock member for securing the electrical controller therein. In some implementations, the dock member provides for a stiff or rigid positioning of the electrical controller therein and the electrical connector provides for flexible positioning within a tolerance distance along first and second perpendicular axes relative to the electrical controller's electrical connector such that the electrical controller can be physically secured therein the dock member with a proper electrical connection between its electrical connector and the electrical connector.

According to another aspect of the present disclosure, a method of assembling/connecting an electrical connector for connection to another electrical connector of an electrified vehicle is presented. In one exemplary implementation, the method comprises providing a terminal housing defining a set of connection position assurance (CPA) features, providing a cover member configured to selectively engage with the terminal housing and thereby form a first connection portion, providing a set of flexible circuits (FCs) at least partially disposed within the first connection portion, providing a set of terminals each having a first terminal end for electrically contacting a respective FC and a second terminal end exposed via a second connection portion defined by the terminal housing, and electrically connecting the electrical connector to the other electrical connector that is configured to selectively engage with the second connection portion to form an electrical connection therewith via the exposed second terminal ends.

In some implementations, the method further comprises providing a flexible seal member configured to seal the second connection portion, and providing a rigid retainer member configured to secure the flexible seal member therein the second connection portion. In some implementations, each FC further defines an exposed portion for electrically contacting the respective first terminal end, and further comprising an adhesive layer surrounding the FC exposed portion. In some implementations, the set of FCs comprises at least two FCs having their respective first terminal ends offset from each other vertically or horizontally such that the at least two FCs with their exposed portions and their adhesive layers can be arranged in a stacked configuration. In some implementations, the electrical connector is a four-way connector (4WC) having four FCs arranged in a 2×2 configuration. In some implementations, the electrical connector is a ten-way connector (10WC) having ten FCs arranged in a 2×5 or 5×2 configuration.

In some implementations, the other electrical connector is an in-line electrical connector comprising its own set of FCs and arranged approximately parallel with the set of FCs when mated with the electrical connector. In some implementations, the other electrical connector is an electrical connector of an electrical controller of the electrified vehicle. In some implementations, the electrical connector is configured to be floatably mated with a dock member for securing the electrical controller therein. In some implementations, the dock member provides for a stiff or rigid positioning of the electrical controller therein and the electrical connector provides for flexible positioning within a tolerance distance along first and second perpendicular axes relative to the electrical controller's electrical connector such that the electrical controller can be physically secured therein the dock member with a proper electrical connection between its electrical connector and the electrical connector.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the description of the present disclosure are intended to be within the scope of the present disclosure.

BRIEF DESCRIPTION OF THE DRAWINGS

FIGS. 7A-7F are perspective, side, and exploded views of a first example floating electrical connector according to some implementations of the present disclosure;

DETAILED DESCRIPTION

Figure 1:
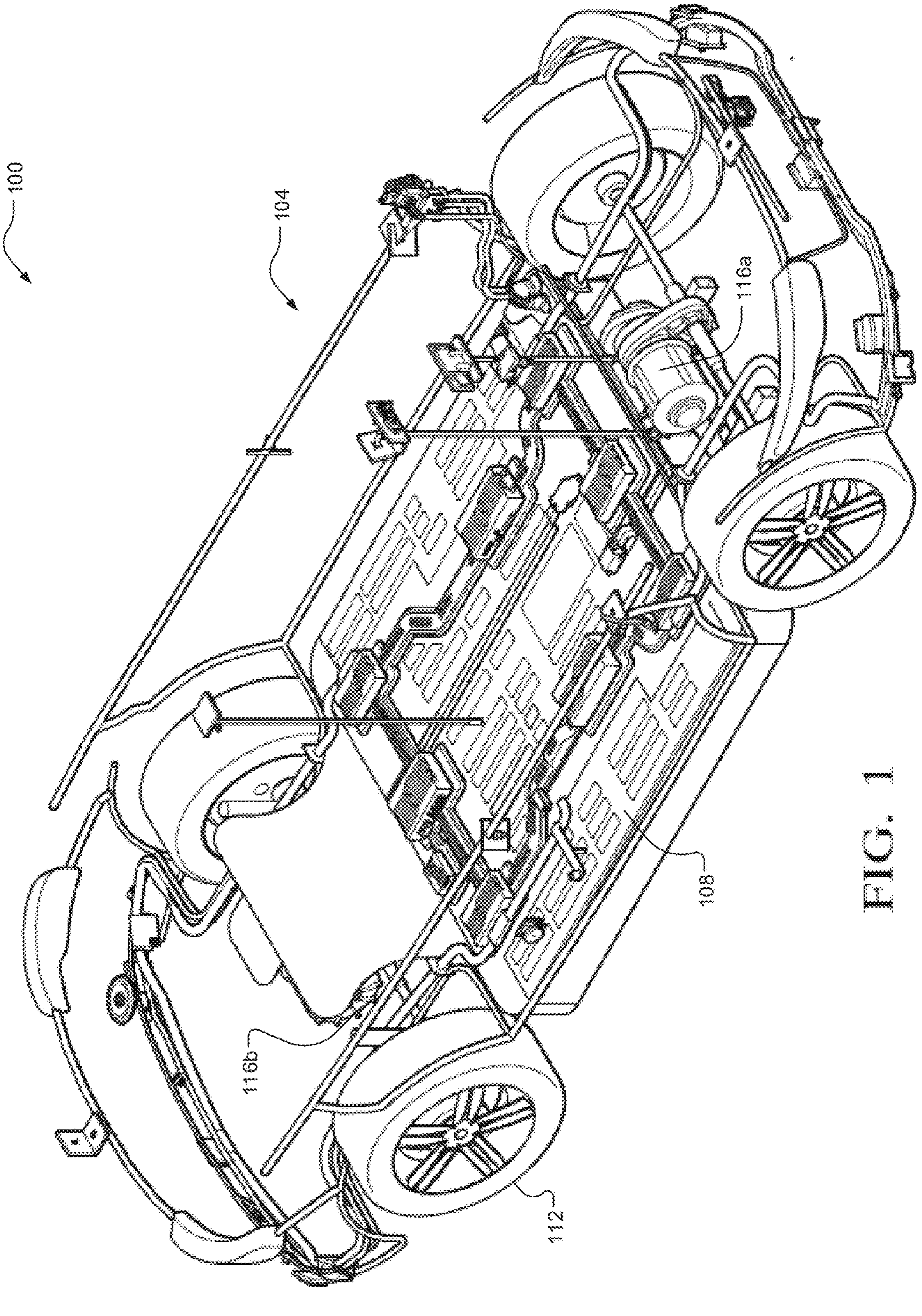
FIG. 1 is a perspective view of an example electrical system for an electrified vehicle according to some implementations of the present disclosure.
Figure 2:
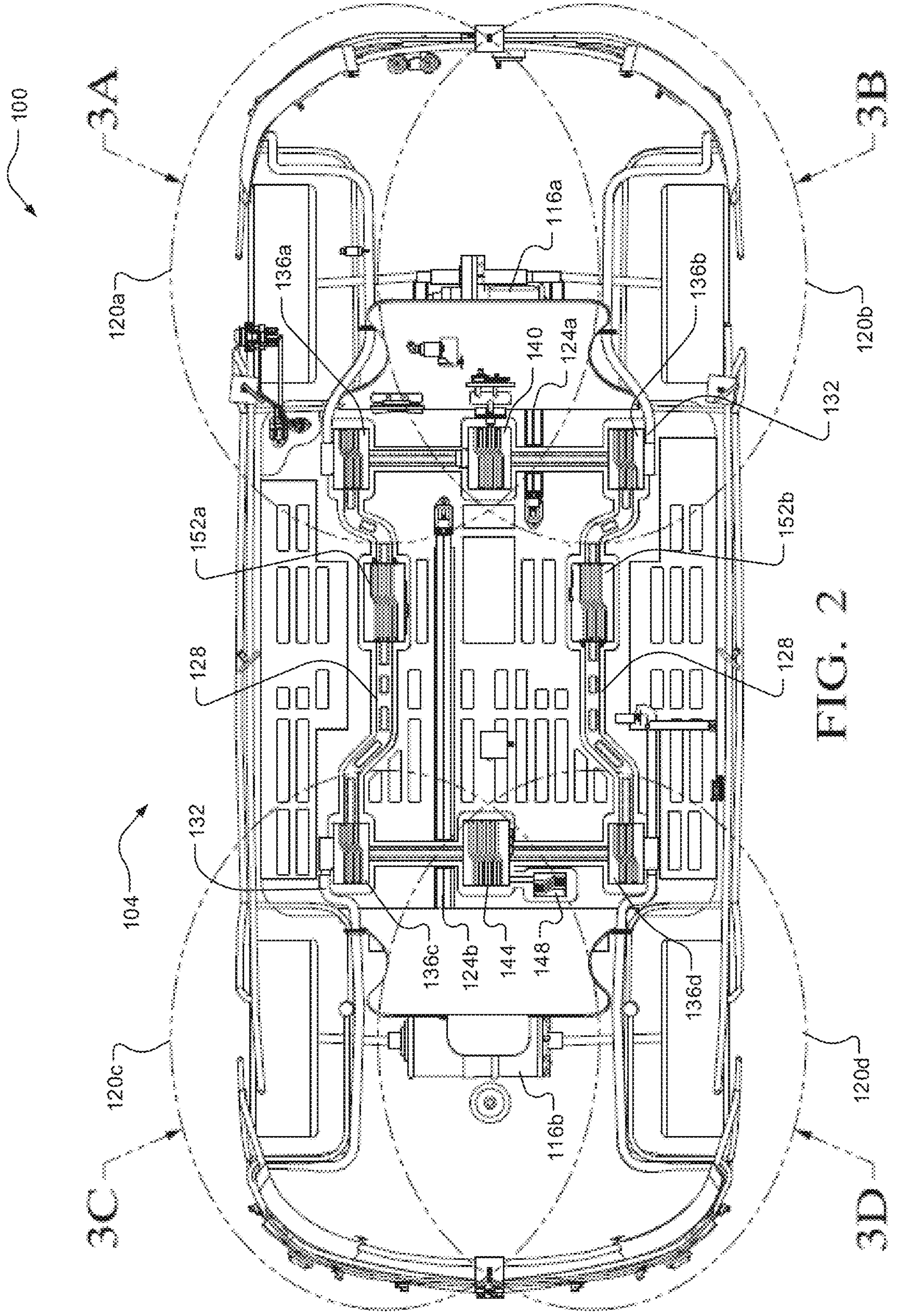
FIG. 2 is an overhead view of the example electrical system of FIG. 1 identifying four zones of the electrical system of the electrified vehicle according to some implementations of the present disclosure.
Figure 3A:
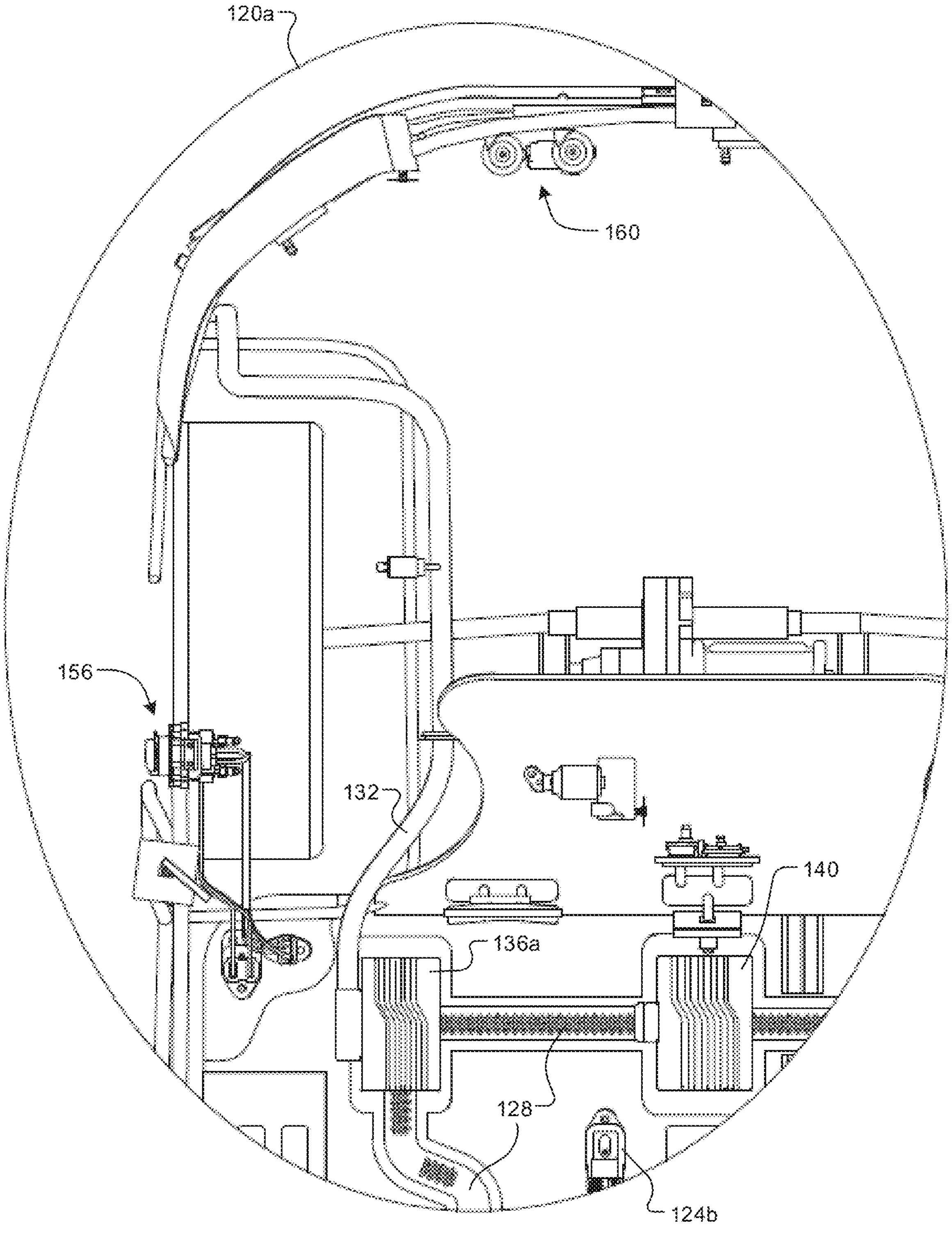
FIGS. 3A-3D are enlarged views of the four zones of the electrical system of the electrified vehicle according to some implementations of the present disclosure.
Figure 3B:
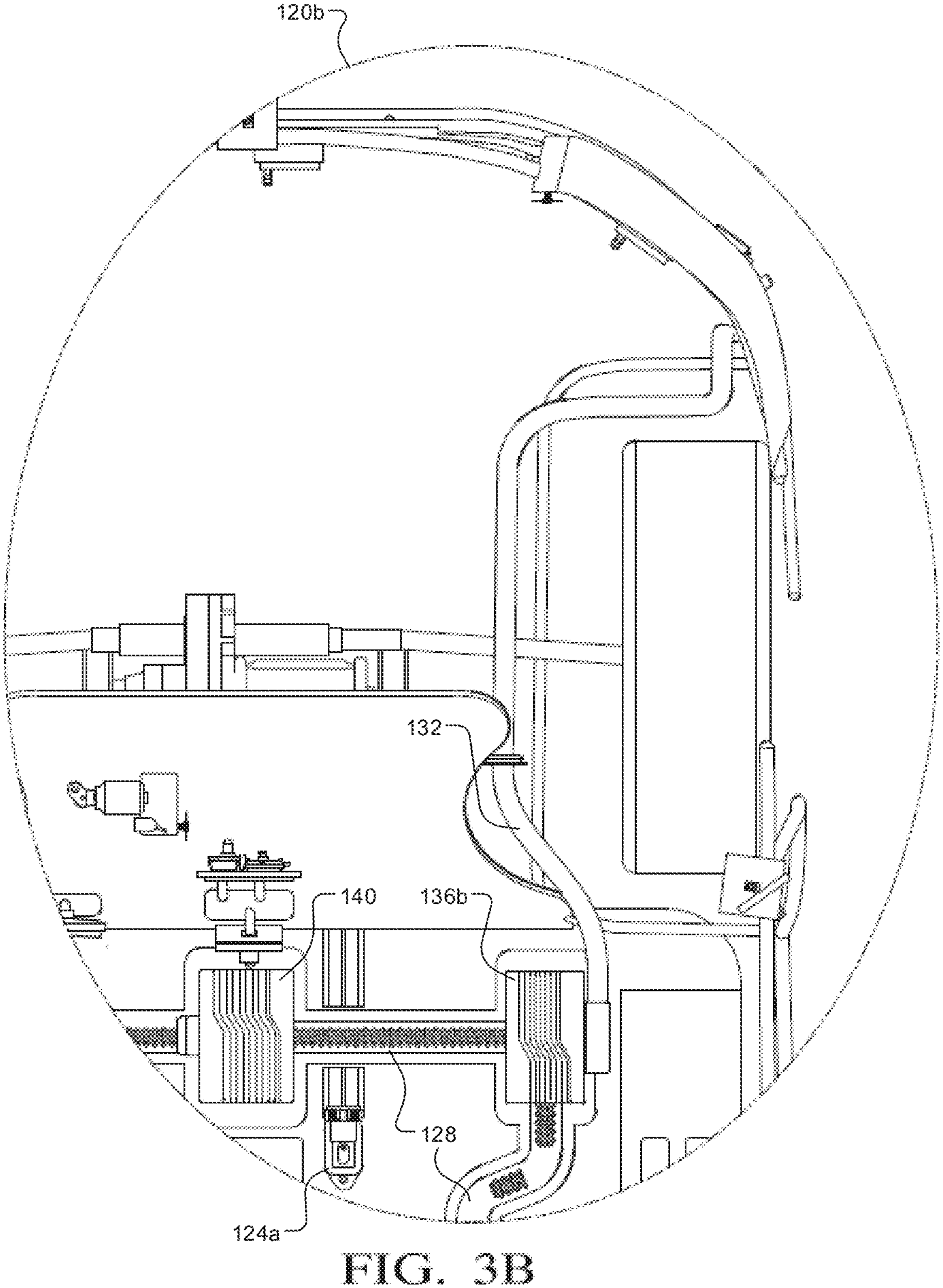
Figure 3C:
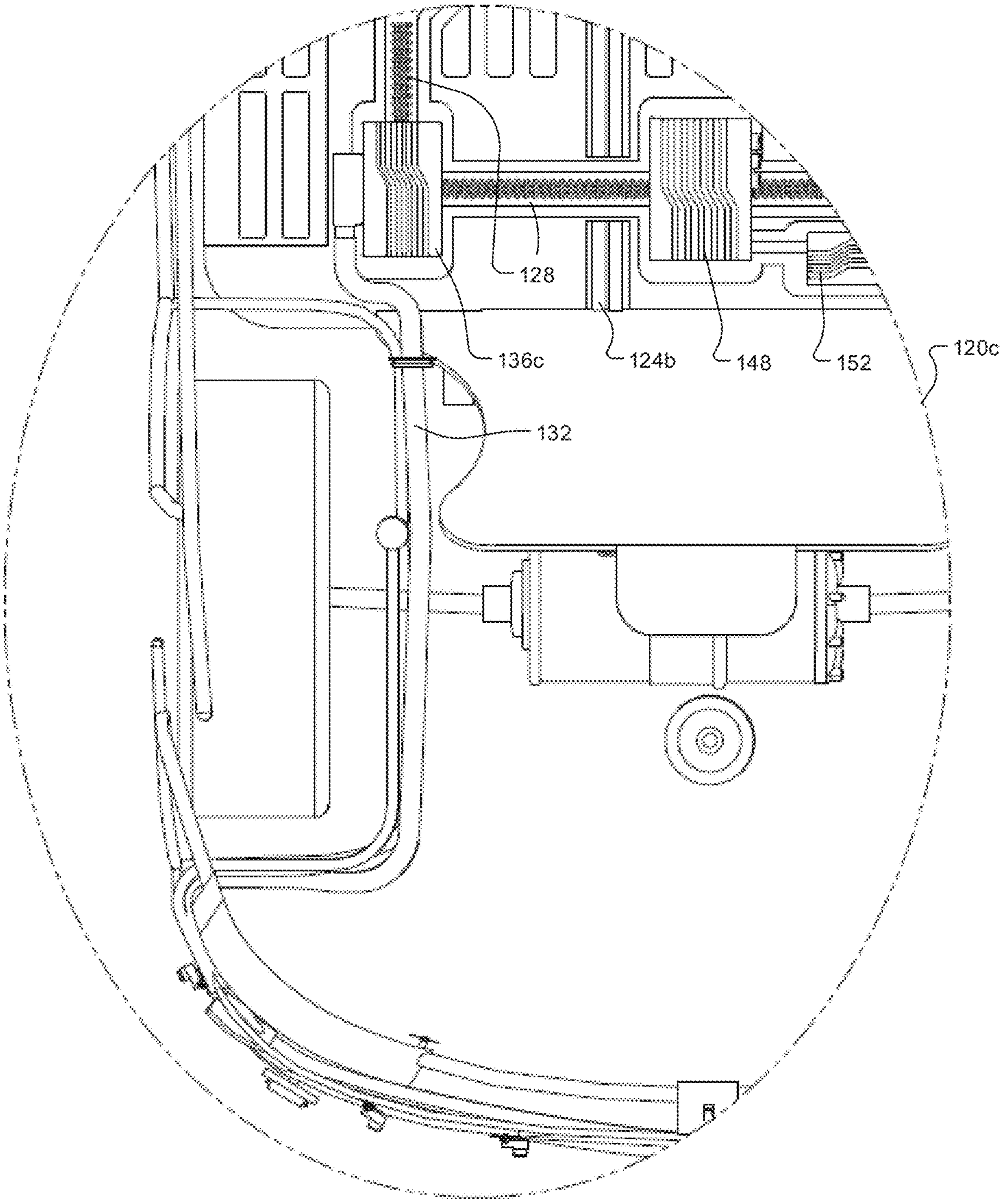
Figure 3D:
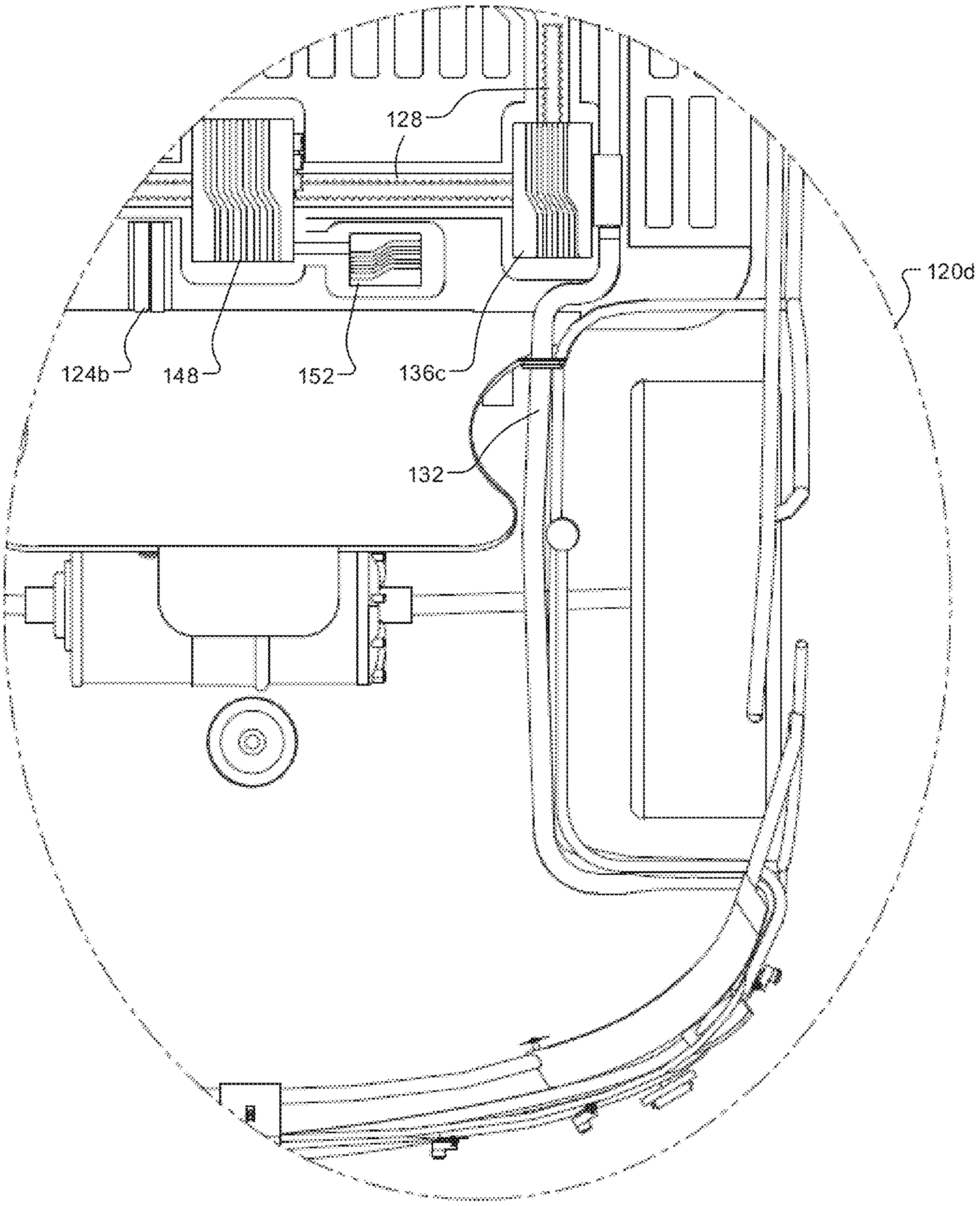

As previously discussed, conventional electrified vehicle electrical systems are large and complex, which increases vehicle costs and weight and decreases vehicle packaging availability. In addition, these conventional electrical systems are very difficult for a human or a robot to install/modify. Accordingly, improved vehicle electrical interconnection systems and methods of formation/installation are presented herein. The electrical system can generally be divided into three distinct sub-systems: a propulsion power system, a power distribution system, and vehicle zone systems. The propulsion power system provides power from the vehicle's battery pack(s) to a propulsion motor(s) in the electrified vehicle (battery electric vehicle (BEV), a hybrid electric vehicle (HEV), etc.). The power distribution system provides electrical power from the battery pack(s), typically at a lower voltage, to multiple vehicle zone systems that supply electrical power to various electrical devices in the vehicle such as motors, lights, and sensors at the voltage required by those devices. It will be appreciated that the term "power distribution system" as used herein could also be referred to as "a power and signal distribution system" as this system could also carry data signals.

Referring now to FIGS. 1, 2, and 3A-3C, various views of an electrified vehicle 100 having an example electrical system 104 according to some implementations of the present disclosure are illustrated. The electrified vehicle 100 comprises a base or body 108, four wheels 112, and at least one electric motor (e.g., electric traction motors), with two electric traction motors 116*a*, 116*b* being illustrated. As previously mentioned, the electrical system 104 can generally be divided into three sub-systems: a propulsion power system, a power distribution system, and vehicle zone systems. The propulsion power system, also referred to as a "first electrical connection layer" and shown at 124*a*, 124*b*, includes metallic conductors that distribute electrical power and provide a ground from battery pack(s) to the motor(s). The conductors are designed to specific dimensions and may be designed to be rigid, e.g., a bus bar, in some areas and flexible in others, thereby allowing the conductors to provide a contoured fit to vehicle surfaces, particularly to the contour of the battery pack(s) and motor(s). Thick, rigid busbar configurations could be required for high power/current distribution (e.g., 60 or more volts, including as high as 400+ volts). The combination of rigid and flexible portions of the propulsion power system may aid robotic installation and robotically aligned electrical connection. These conductors are terminated by electrically conductive connectors, e.g., a male blade or other terminal type, that are affixed, e.g., by welding or crimping to the conductor. The propulsion power system may also contain insulative connector covers to prevent contact with energized connectors or conductors. The connectors and connector covers preferably include alignment and handling features to facilitate robotic connection of the connectors and connector covers to a vehicle component, e.g., a motor or battery pack. Alignment and handling features suitable for use with a robot are incorporated into the conductors or added to the conductors in the form of channels, clips, attachments, etc. The conductors, connectors, and connector covers are preferably designed to facilitate an automated robotic "top down" installation process. As used herein, a top-down installation process describes assembling a second system, e.g., the power distribution system, onto a previously installed device, e.g., the propulsion power system, preferably along the Z-axis as defined by Society of Automotive Engineers (SAE) Standard J670.

Figure 4:
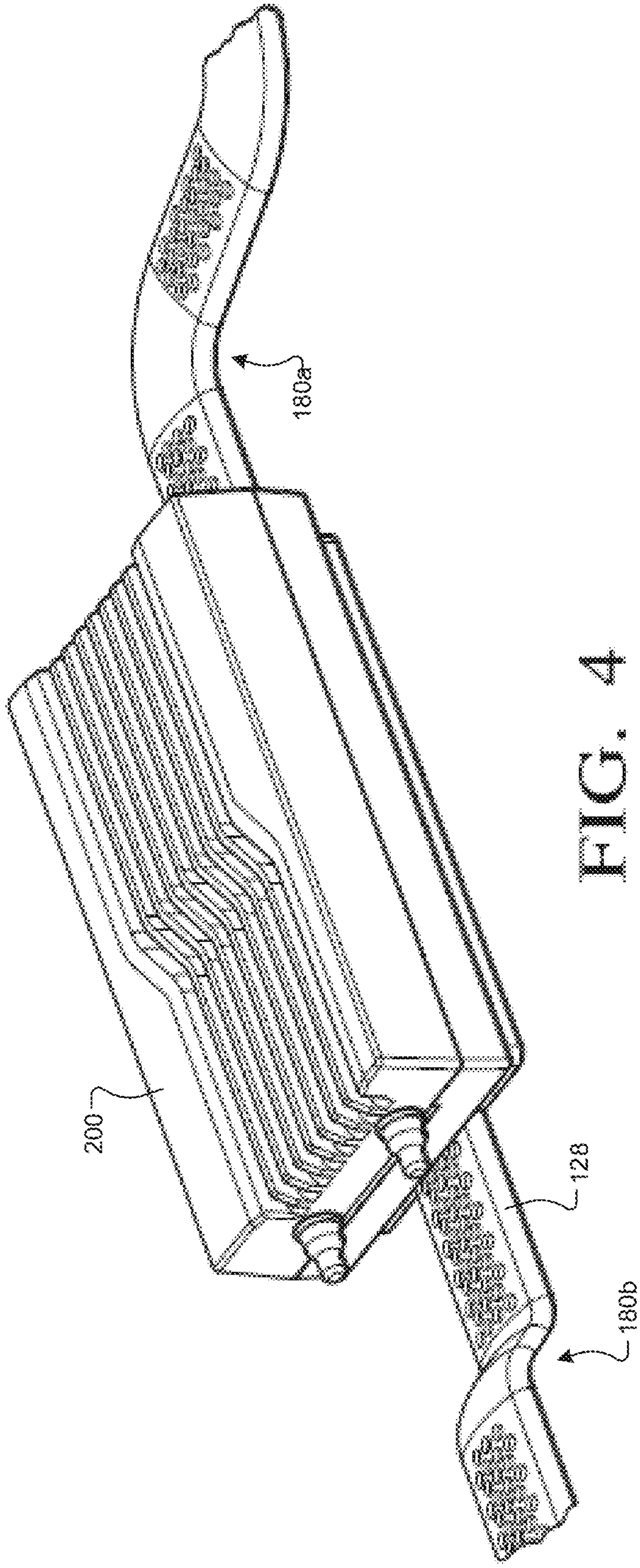
FIG. 4 is an enlarged view of an example controller and associated electrical connection layers according to some implementations of the present disclosure.

The power distribution system, also referred to as a "second electrical connection layer" and shown at 128, includes metallic power circuits to provide electrical power and provide a ground to various control modules and other devices within the vehicle 100. These may also be referred to as "backbone cables" as they provide the requisite power throughout the electrical system 104. The power distribution system 128 also includes metallic data circuits to transmit signals to/from the various control modules and other devices, such as voltage converters (e.g., DC-DC converters). Dielectric and adhesive materials may be laminated to the power and data circuits to insulate and/or shield the power and data circuits. The power and data circuits may be incorporated into flexible circuits ("FCs," such as a flexible printed circuit, or "FPC") that are designed to be contoured to the shape of sheet metal of the vehicle body along X, Y, and Z axes of the vehicle 100 per SAE Standard J670. Alignment and robotic handling features may be designed into the FC or may be incorporated as added components (channels, clips, attachments, etc.) These features can also be designed to improve flexibility or rigidity in specific areas of the FC. Additional wires may be "piggy backed" to the FC as needed. Longitudinal features, e.g., perforations may be integrated into FC assembly to facilitate bending or folding of the FC, thereby allowing improved installation characteristics of the power distribution system into the vehicle 100. FIG. 4, for example, illustrates an example controller 400 having the power distribution system or backbone cabling 128 there along and having both a curve feature 180*a* and a stepped (e.g., step-down) feature 180*b*. The FC may be cut to required length and insulation and/or adhesive is selectively removed at electrical connection points. Electrical connections are facilitated using welded or pressure contact terminals and positioned in a connector. To facilitate robotic installation of the power distribution system into the vehicle 100, the connectors are designed to be collated in a holder that controls required connection orientation allowing a robotic top-down installation method. The power distribution system 128 includes connector holders that are fixed into the vehicle 100 using snap-fit or other features. The connector holders may have integral alignment features, thereby allowing the mating of the power distribution system with control modules containing voltage convertor circuitry or other devices connecting the power distribution system to the propulsion power system to be performed robotically using the top-down installation method. The FC and connector assemblies of the power distribution system can be installed individually or as multiple assemblies that are pre-assembled and installed into the vehicle 100 as a single unit.

The power distribution system 128 is interconnected with the vehicle zone systems (see four corner zones 120*a*-120*d*) via power data center(s) (PDCs) or "zone controllers" as shown at 136*a*-136*d* that contain voltage convertor circuitry to convert the voltage of the power distribution system to the voltage required by devices (actuators 156, sensors 160, etc.) interconnected to the vehicle zone system. While four zones are shown and described herein, it will be appreciated that there could be two zones (e.g., front/rear or front left/front right) or three zones (e.g., front left/front right/rear) or more than four zones. The PDCs also contain control logic to control the various devices connected to the vehicle zone system based on data transmitted via the power distribution system. The PDCs may also contain data gateways to control the flow of data between devices connected to the vehicle zone system and the power distribution system. It will be appreciated that each zone can have a plurality of actuators and/or sensors associated therewith, including, but not limited to, motorized devices (speakers, locks, motorized controls for doors/windows/mirrors, etc.) and sensors (RADAR, LIDAR, camera(s), etc.). There may be one PDC for each vehicle zone system in the vehicle 100. The connector system between the PDC and the power distribution system may be designed to facilitate an automated "dock and lock" assembly method. The "dock and lock" connection system is designed to self-align using lead in pins with a floating connector holder to support robotic assembly of the PCB with the power distribution system. Each vehicle zone system includes metallic lower voltage power circuits, also referred to as "a third electrical connection layer" and shown at 132, to provide electrical power and provide a ground to the devices 156, 160 within a zone the vehicle 100. As used herein "lower voltage" means lower than the operating voltage of the power distribution system. This could include, for example only, a voltage selected from the group consisting of 48 volts, 24 volts, 12 volts, 5 volts, and 3.3 volts. It will also be appreciated that this lower voltage could be an even lower voltage, such as devices/sensors advance over time. The vehicle zone system also includes metallic zone data circuits to transmit data between the PDC and the devices within the zone. The electrical system of the vehicle 100 may be divided into several zones, such as left front quadrant 120*a*, right front quadrant 120*b*, left rear quadrant 120*c*, and right rear quadrant 120*d*. Laminated dielectric and adhesive materials may be used to insulate or shield the lower voltage power circuits and zone data circuits. It will be appreciated that at least a portion of the third electrical connection layer 132 or another (e.g., a fourth electrical connection layer) could also be arranged atop the second electrical connection layer 128.

The lower voltage power circuits and zone data circuits may be incorporated into FCs that are designed to be contoured to the shape of sheet metal and to accommodate layout of other vehicle components and devices along the X, Y, and Z axes of the vehicle 100. Alignment and robotic handling features may be designed into the FC or may be incorporated as added components (channels, clips, attachments, etc.) These features can also be designed to improve flexibility or rigidity in specific areas of the FC. Additional wires may be "piggy backed" to the FC as needed. Longitudinal features, e.g., slits, may be integrated into FC assembly to singulate circuits and/or facilitate bending or folding of the FC, thereby allowing improved installation characteristics of the power distribution system into the vehicle 100. The FC may be cut to required length and insulation and/or adhesive is selectively removed at electrical connection points. Electrical connections are facilitated pressure contact terminals preloaded in connectors and positioned/fixed onto the FC. To facilitate robotic installation, connectors are designed to be collated in a holder for precise location. Each connector is designed to be manipulated with a robotic end effector for device connection. The connector holder can be designed as dunnage secured to a PDC with connections from the FC assembly (non-device) already completed.

In addition to the zone controllers 136*a*-136*d*, the electrical system 104 could include a plurality of other controllers. For example, a chassis/body controller 144 could be connected in a front-central portion of the electrical system 104 and configured to control one or more vehicle body accessory devices (power windows, power mirrors, air conditioning, an immobilization system (seatbelts, airbags, etc.), central locking, and the like. Also, for example, a gateway controller 148 having an associated network module or transceiver 152 could be connected in a read-central portion of the electrical system and configured to control data transmission to/from the electrified vehicle 100 via one or more networks (GPS, cellular, etc.). Further for example, one or more server platform controllers 152*a*, 152*b* could be arranged towards between at least one of (i) the front left and rear left zones 120*a*, 120*c* and (ii) the front right and rear right zones 120*b*, 120*d* and configured for high-level processing for control of the electrified vehicle 100. These server platform controllers 152*a*, 152*b* are configured to handle the highest-level processing in the electrified vehicle, such as executing machine learning algorithms as part of ADAS or autonomous driving functions of the electrified vehicle 100. As shown, there are two server platform controllers 152*a*, 152*b* to improve redundancy (e.g., output checking/comparison) and also to cover the event of a single controller malfunction or failure. It will be appreciated that these locations for the chassis/body controller 144, the gateway controller 148, and the server platform controller(s) are merely examples and that there could be other suitable positioning and/or combining of multiple controllers into a single controller.

As previously mentioned, for practical assembly and service, automotive electrical systems often utilize separable electrical connection systems. The separable connection systems form electrical connections between different types of metal conductor elements, typically wire-to-wire connections and wire-to-device connections. These separable electrical connectors have multiple cavities which retain conductive metal terminals, that usually are crimped to stranded wire. The mating of automotive electrical connection systems requires labor intensive manual assembly. These connector systems are designed with manual assembly feedback features that are not suitable for reliable automated robotic assembly, and also prone to mis-mating when manually assembled. Another aspect of the present disclosure described herein therefore comprises an electrical connector system with self-aligning mate assurance features that enable the use of robotic assembly processes (as well as hum assembly processes or combinations thereof), with a reliable electrical connection mating result. Some of these novel features include, but are not limited to, a self-aligning mate assurance modular docking electrical connector system that defines (1) a design suitable for automated robotic mating of connectors a engine control unit (ECU) module, using a simple "top down" assembly process, (2) a connector system that connects a vehicle wiring harness to an ECU module, when that ECU module is docked into a holding dock, (3) a docking connector system with X-Y-Z floating features that allows multiple connector systems to self-align and fully mate with a docked ECU module, (4) docking connector system with interlocking modular terminal housing features that stack in a manner to supply alignment, keying and structural support for mating forces, (5) a docking connector system which may or may not include force return springs and that assist during unmating to reset the pre-staging of the connector module, and also dampening motion induced by vehicle vibration, (6) a mating ECU connector with one or more internal latches which automatically latch when connector mate, and automatically unlatch during connector unmating, (7), docking connectors that are moveably mounted, to a sheet metal dock, (8) docking connectors that float in X-Y direction within a sheet metal dock, (9) docking connectors that electrically mate to an ECU connector, locked together by multiple flexible locking latches, (10) docking connectors have a Z axis motion blocking feature that is released by a mating feature on the mating ECU connector, allowing the docking connector to float in the Z axis with the mated ECU connector, (11) docking connectors latched to ECU connector, that are floatably mounted relative to the sheet metal dock, and able to absorb all misalignment and system tolerances in X-Y-Z directions, when ECU is locked into said sheet metal dock, and (12) a possible alternate embodiment, inline wire-to-wire connector system, where one connector has a manually operated locking latch and one or more automatically locking/releasing latches.

Figure 5A:
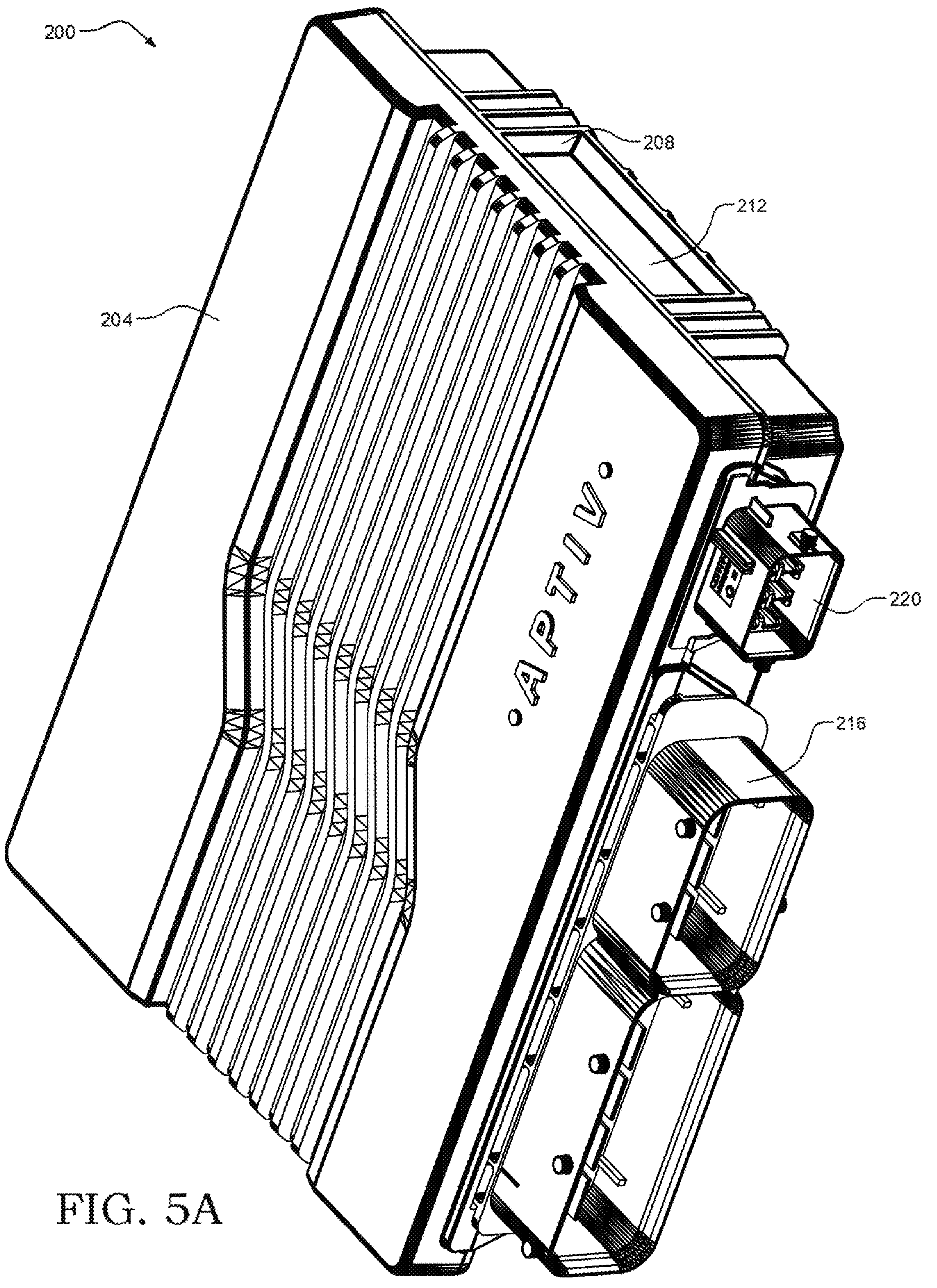
FIGS. 5A-5B are a perspective views of an example electrical controller according to some implementations of the present disclosure.
Figure 5B:
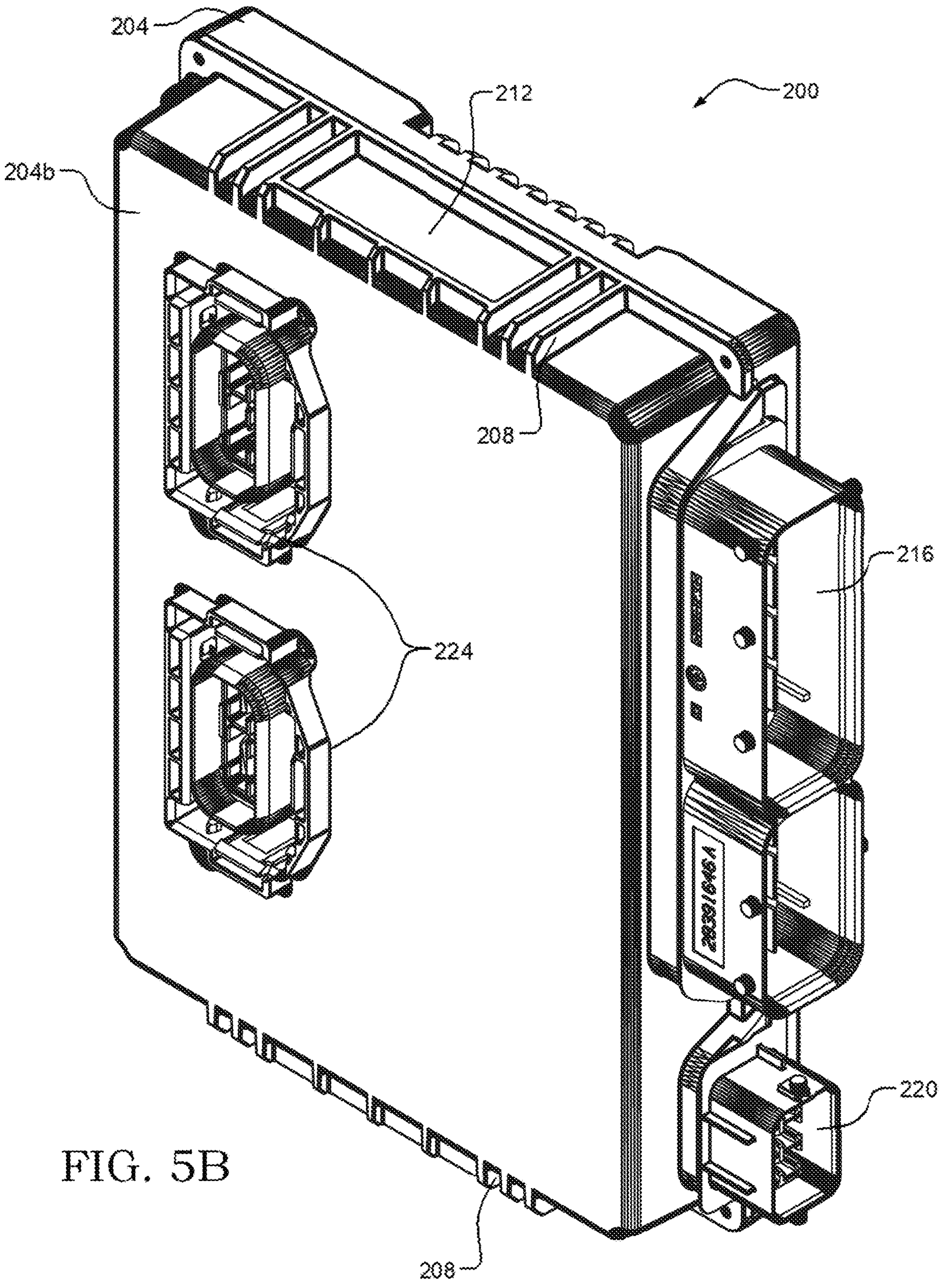
Figure 6:
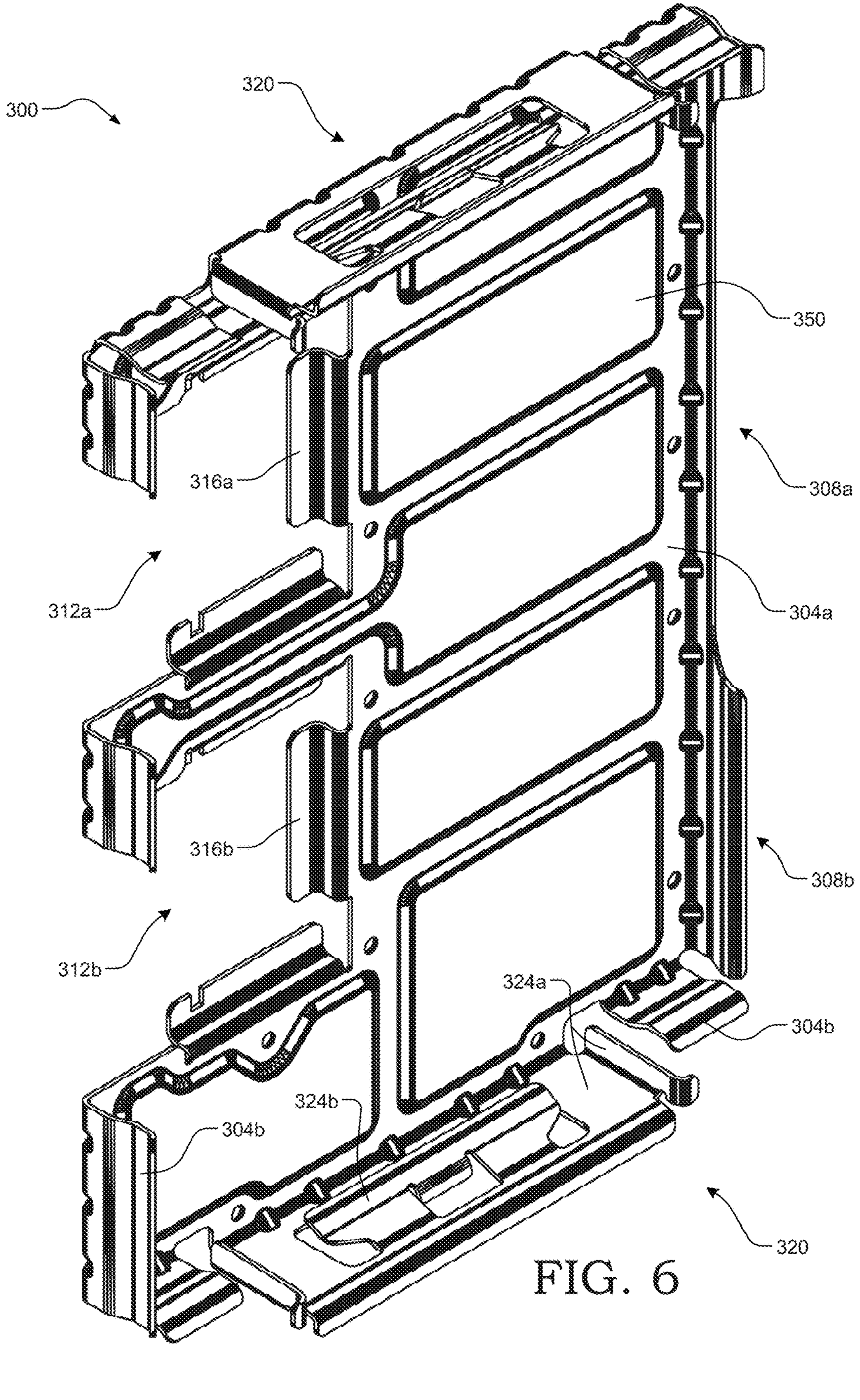
FIG. 6 is a perspective view of an example dock member for the example electrical controller of FIGS. 5A-5B according to some implementations of the present disclosure.

Referring now to FIGS. 5A-5B and 6, perspective views of an example electrical controller 200 (or "controller 200") and a dock member 300 according to some implementations of the present disclosure. The controller 200 comprises a housing 204 that houses complex internal electronics (one or more processors, memory, etc.) for controlling aspects of the electrified vehicle 100. As shown, the dock member 300 has a shape that generally corresponds to that of the controller 200 as it is configured to at least temporarily secure the controller 200 therein. In one exemplary implementation, the dock member 300 is formed of sheet metal (e.g., aluminum) as it is relatively inexpensive and easy to form/manipulate. It will be appreciated, however, that the dock member 300 could be formed of other suitable rigid materials, such as stiff plastics or other polymers. In one exemplary implementation (e.g., a sheet metal dock member 300), the inner portion of the bottom surface 304*a* of the dock member 300 comprises a plurality of heat sinks or heat transfer materials 350 to provide for heat management of the controller 200 and the thermally conductive (sheet metal) dock member 300. As shown, the controller 200 comprises side electrical connectors 216 and 220 having different sizes/heights as well as exposed electrical connectors 224 defined in a bottom portion 204*a* of the housing 200. The dock member 300 is also configured to be fixed to a frame of the electrified vehicle 100 or another suitable surface therein and is configured to receive other electrical connectors via electrical connectors 224 disposed or defined in its bottom surface 204*b*.

The controller 200 and the dock member 300 also define dock-controller CPA features. These can include, for example, features for guiding and securement of the electrical controller 200 within the dock member 300 along a third axis (e.g., Z-axis, for top-down installation/removal). In some implementations, some of the dock-controller CPA features comprise an alignment feature 324*a* (generally referenced as one of features 320) defined by one of the four side portions 304*b* of the dock member 300 and a complimentary alignment feature 208 defined by a side surface of the electrical controller housing 204 that initially contacts and provides for proper positioning of the electrical controller along the first and second axes (X/Y axes). These alignment features 208, 324*a* interact during the securing of the electrical controller 200 within the dock member 200 to guide the electrical controller along the third axis. In some implementations, some of the dock-controller CPA features comprise a securement clip 324*b* (generally referenced as one of features 320) defined by the one of the four side portions 304*b* of the dock member 200 and a complimentary securement recess 212 defined by the side surface of the electrical controller housing 204 that interacts with the securement clip 324*b*. In some implementations, the securement recess 212 defines a wedge-shaped surface that engages the securement clip 324*b* to temporarily secure the electrical controller 200 therein the dock member 300. In some implementations, some of the dock-controller CPA features comprise first and second gap areas 308*a*, 308*b* defined by one of the four side portions of the dock member 300 and having different heights that correspond to two or more side electrical connectors 216, 220 of the electrical controller 200. The first and second gap areas 308*a*, 308*b* provide for a relief tolerance between the dock member 300 and the electrical connector 200 during mating. In some implementations, the first gap area 304*a* defines a first height corresponding to taller first and second side electrical connectors 216 and the second gap area 304*b* defines a greater second height corresponding to a shorter third side electrical connector 220. The dock member base 304*a* and one dock member side portion 304*b* define at least one gap portion 312*a*, 312*b*, each defining at least one recessed tab structure 316*a*, 316*b*, wherein the at least one gap portion 316*a*, 316*b* is configured to receive at least one floating electrical connector (not shown), which will now be described and shown in greater detail.

Figure 9A:
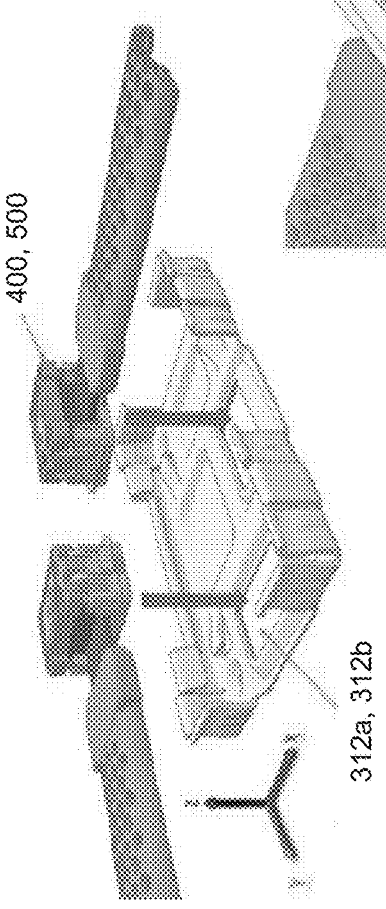
FIGS. 9A-9H are views alternate features of the electrical connectors and controllers as shown and described herein according to some implementations of the present disclosure.
Figure 9B:
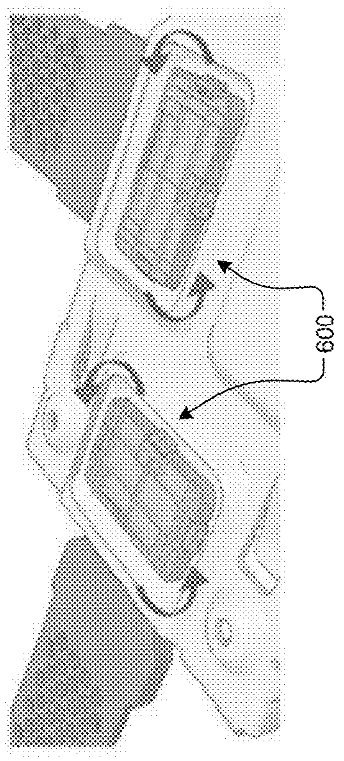
Figure 9C:
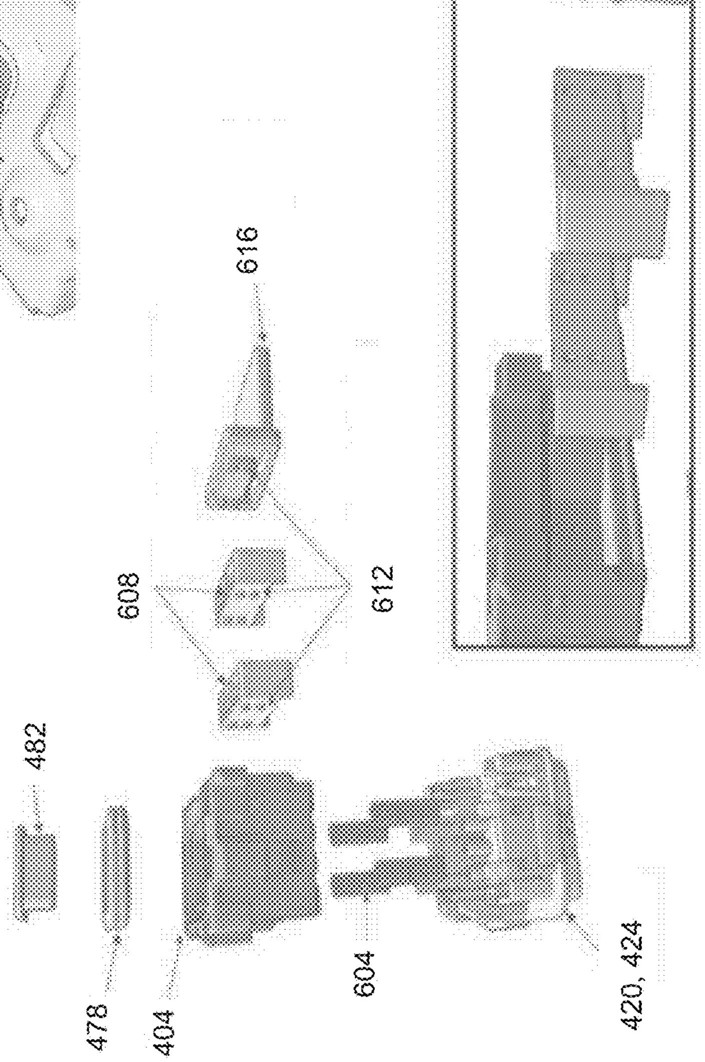
Figure 9D:
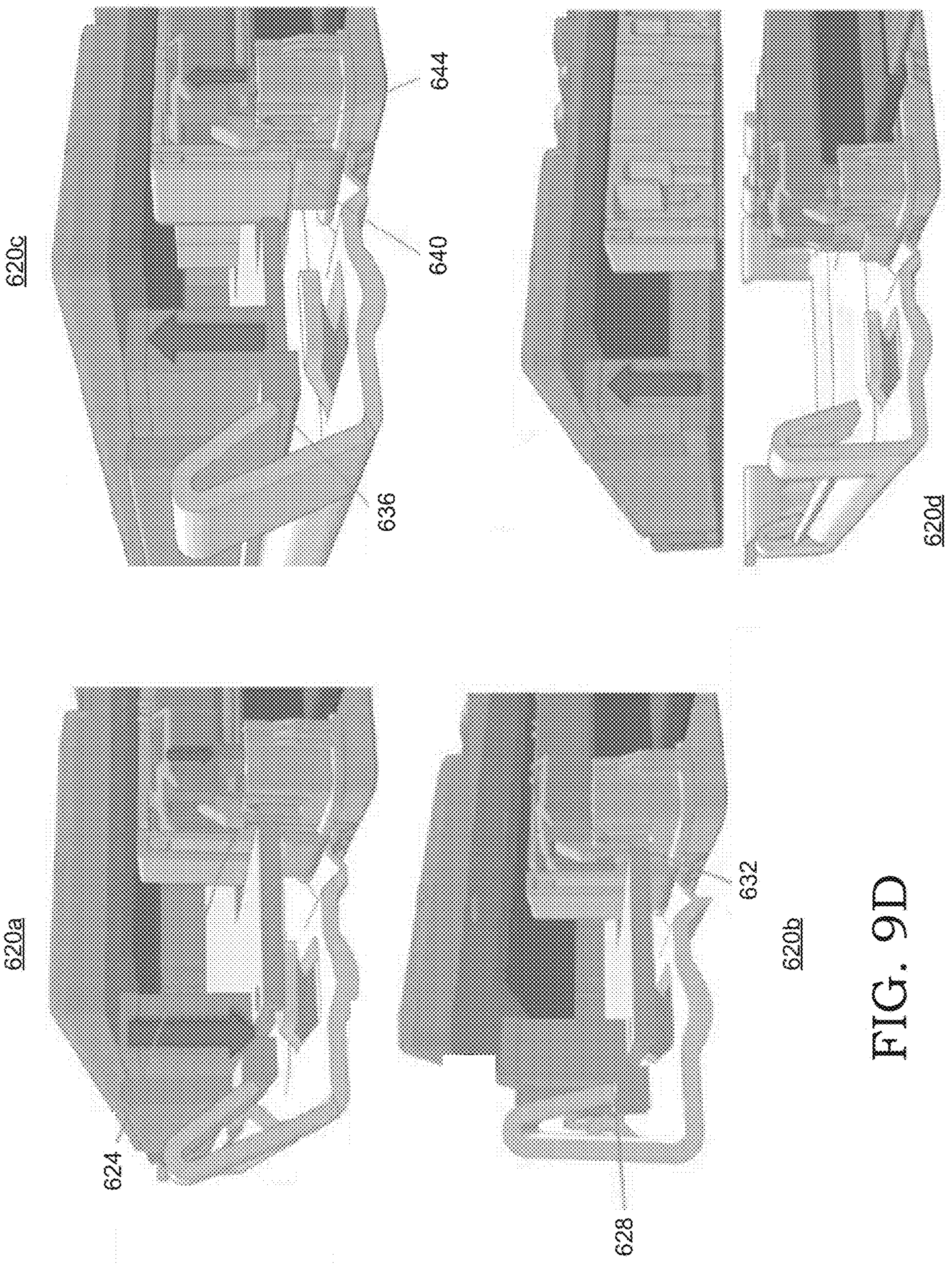

Referring now to FIGS. 7A-7F and with continued reference to the previous FIGS. and periodic reference to FIGS. 9A-9F, perspective, side, and exploded views of a first example floating electrical connector 400 (or "connector 400") according to some implementations of the present disclosure are illustrated. The connector 400 generally comprises a main body or housing 404 that defines a first connection portion 408 and a second connection portion 412. As shown, these connection portions 408 are generally arranged at approximately 90 degrees with respect to each other, but it will be appreciated that alternate configurations could be utilized. The connector 400 receives, via the first connection portion 408, one or more FCs 416 and has respective terminals and contacts therein (not yet shown) for providing exposed terminals at the second electrical connection 412. The connector 400 is described as "floating" because it is floatably mateable with the dock member 300 such that the connector is movable by a tolerance distance amount 600 (e.g., +/−2 millimeters; see FIG. 9B) along each of at least first and second perpendicular axes (X/Y axes) that are each parallel to the base portion 304*a* of the dock member 300. More specifically, each cap member 420, 424 defines a cap member area that is less than an area of the gap portion 312*a*, 312*b* to thereby allow the floating electrical connector 400 to be movable by the tolerance distance amount along each of at least first and second perpendicular axes. Thus, while the dock member 300 provides for a stiff or rigid positioning of the electrical controller 200 therein, the floating electrical connector 400 provides for simultaneous flexible positioning (i.e., "self-aligning") of the electrical connector 400 within the tolerance distances (e.g., see FIG. 9B) relative to the corresponding electrical controller connector 224 such that the electrical controller 200 can be physically secured therein the dock member 300 with a proper electrical connection between its electrical connector 224 and the floating electrical connector 400. The larger width/size of the cap member 420, 424 at its base (i.e., a top cap portion 420 and a wider/larger base cap portion 424) allows for the above-described movement as well as interaction with the recessed tab structures 316*a*, 316*b*. FIG. 9D illustrates various states of the mating and removal processes of the controller 200 with the dock member 300. In a first stage 620*a*, the controller 200 begins engaging the dock member 300 at 624. In a second stage 620*b*, the controller 200 is latched into the dock member 300 and a blocking feature 628 is released, allowing the floating connector 400 to move downward in the Z-direction along with the controller connector 224. In a third stage 620*c*, the controller 200 is being removed from the dock member 300, the controller 200 is unlatched at 636, the latch assurance blocking feature 640 automatically disengages, and ramps 644 automatically release connector latches allowing the controller 200 to be removed from the dock member 300. In a fourth and final stage 620*d*, the controller 200 is fully removed from the dock member 300.

Figure 7A:
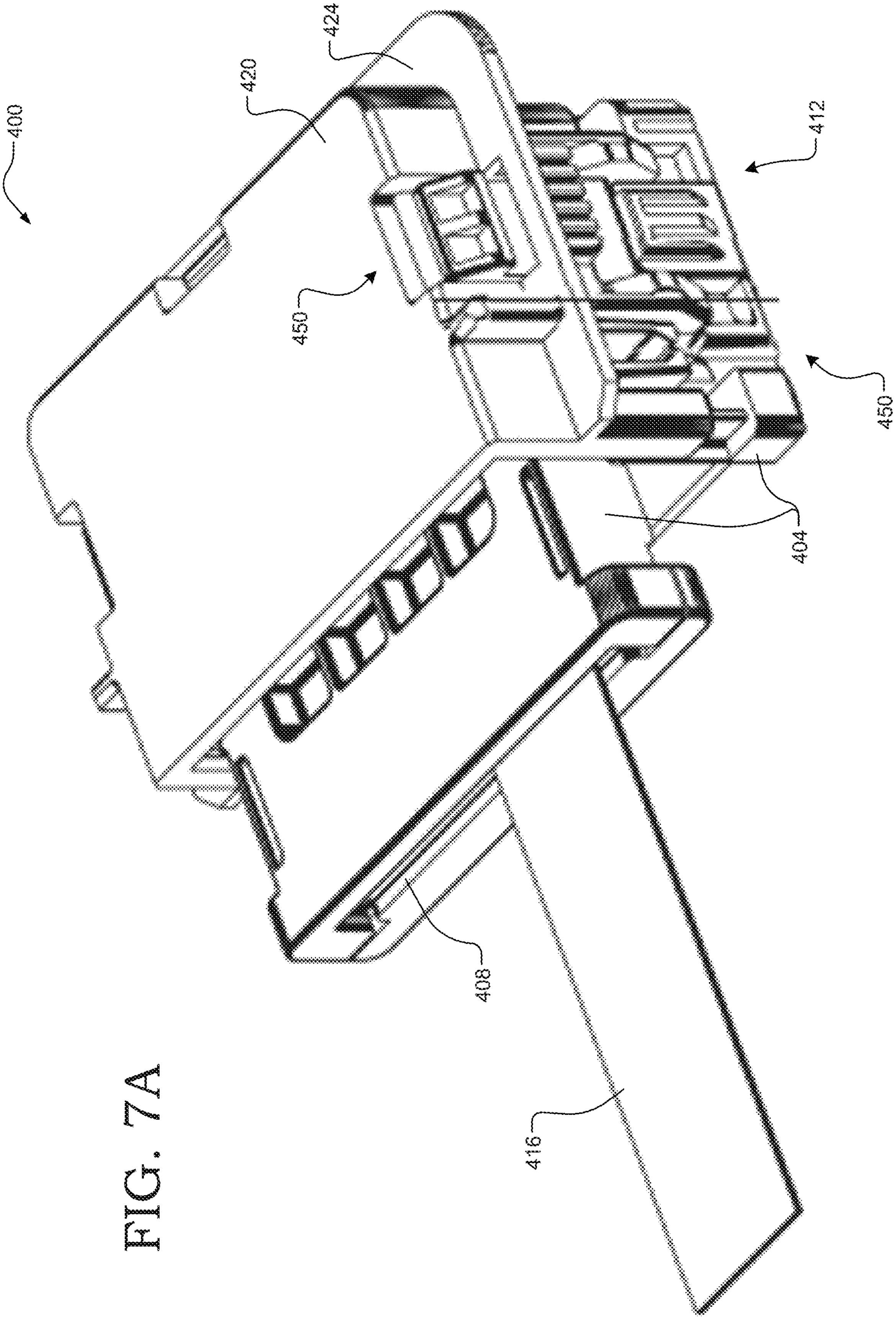
Figure 7D:
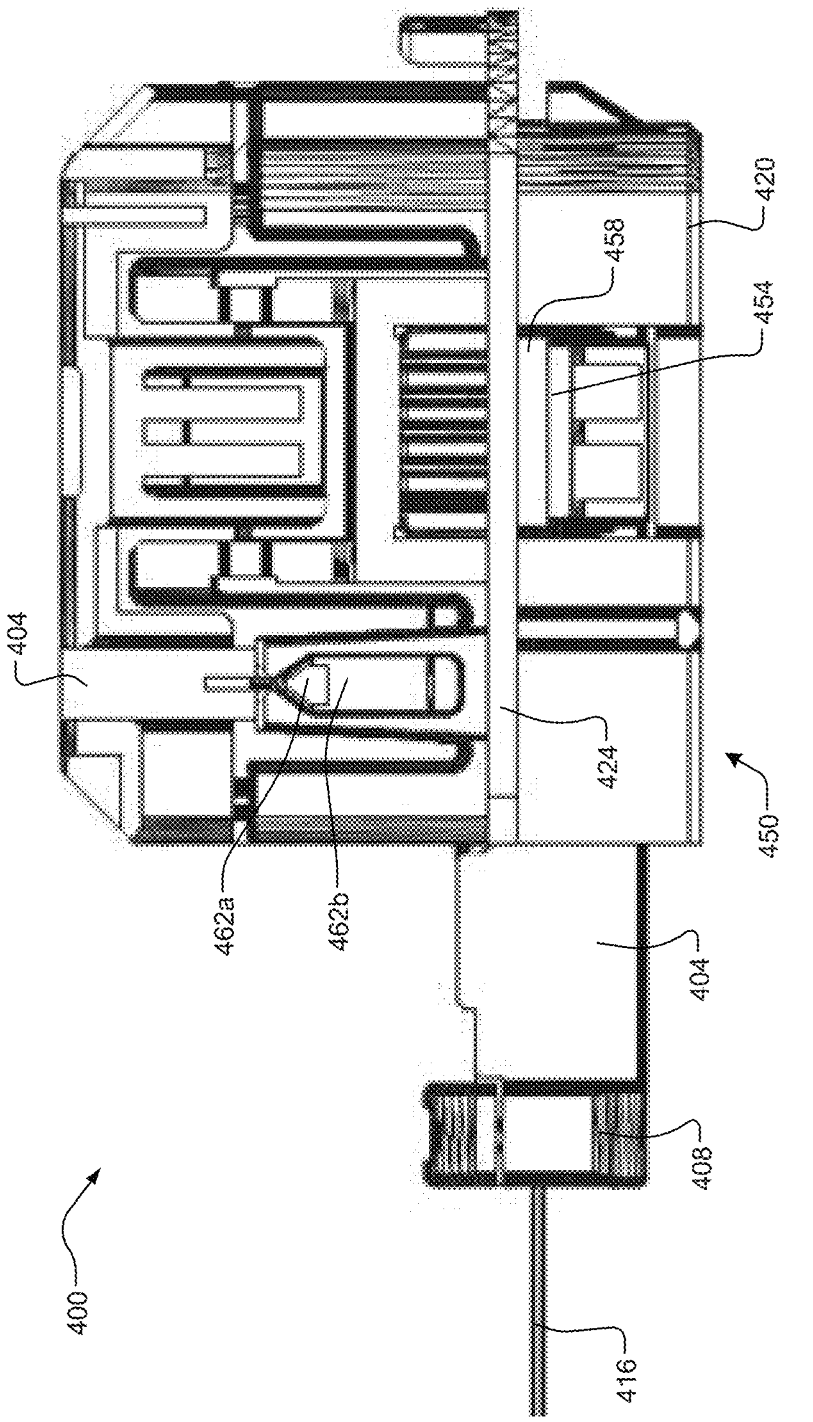
Figures 7E, 7F:
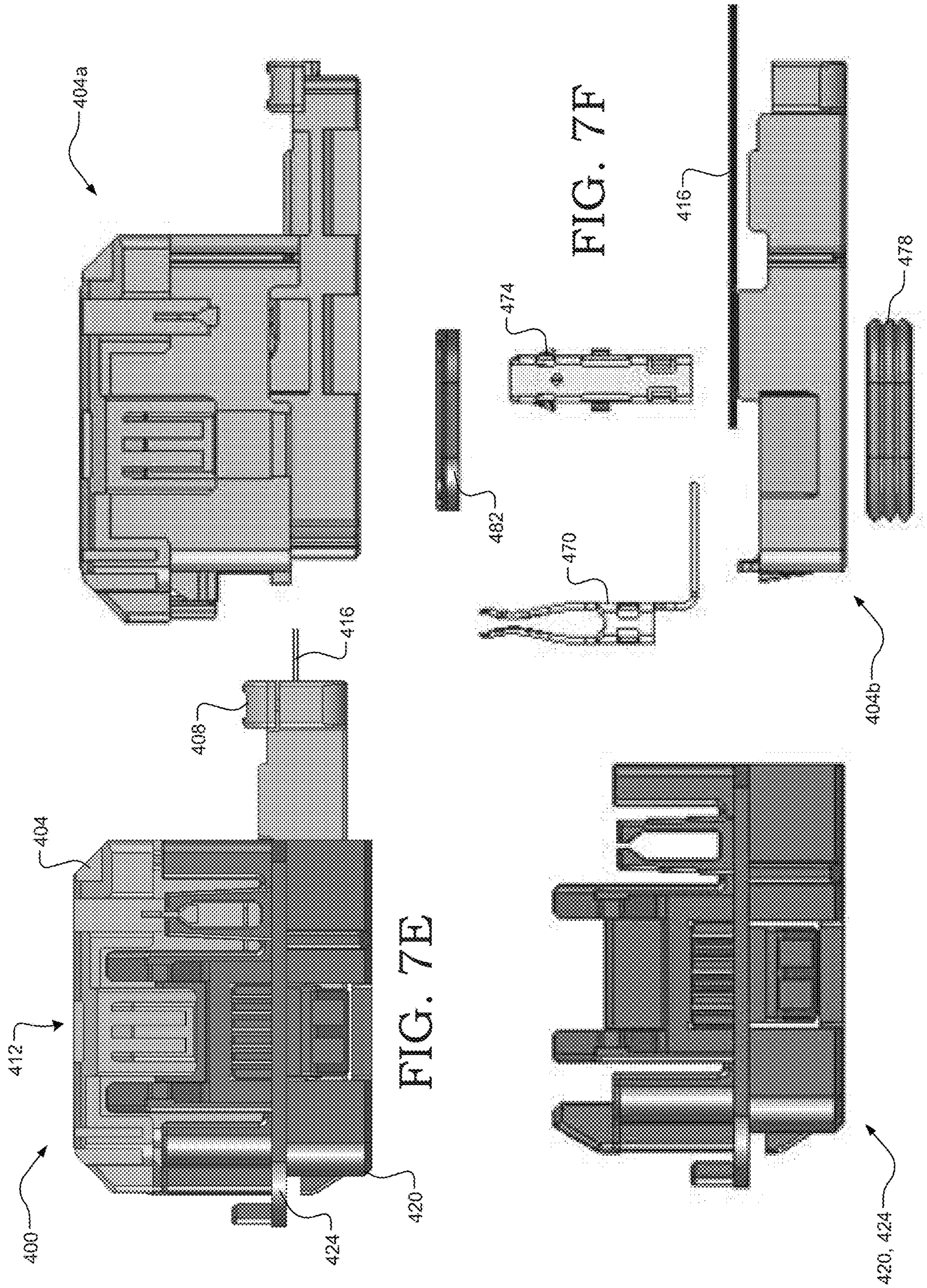
Figure 9F:
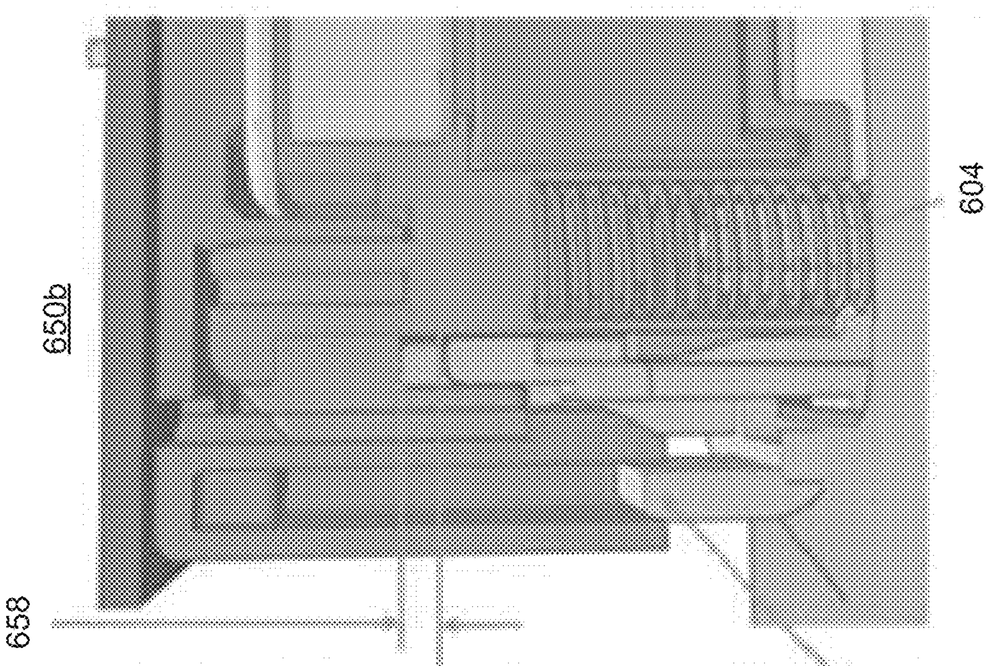
Figure 9E:
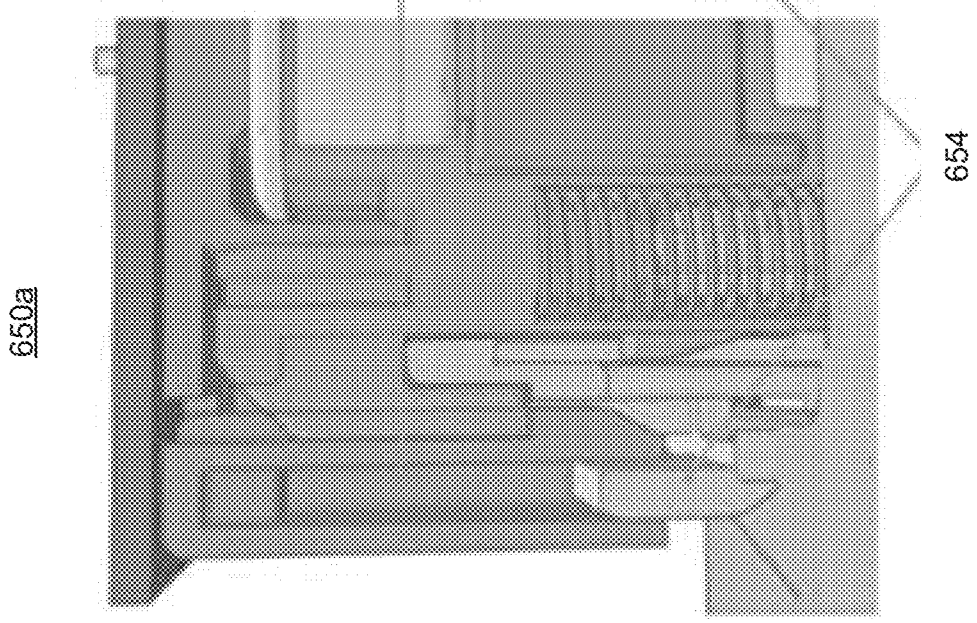

The cap member 420, 424 is also complimentary to the main body or housing 404 and that is securable thereto via respective CPA features 450. In some implementations, the above-mentioned CPA features 450 include a tab or clip 454 above a recessed surface 458 and/or a tab 462*a* configured to be forcibly inserted through and into a recessed area 462*a* to thereby secure the cap member 420 to the main body or housing 404 (e.g., after assembly/insertion of the componentry therein). FIGS. 7A-7C illustrate a pre-staged position where this secure connection is not yet complete, and FIGS. 7D-7F illustrate the final position where this secure connection is complete. FIGS. 7E-7F illustrate side and exploded views of the connector 400 with shading to further illustrate the separate components. The housing 404 is generally divided into two portions 404*a* and 404*b* and have therein an exposed portion of the FC 416, a blade terminal 470 for contacting the exposed portion of the FC 416, another terminal 474 for contacting the blade terminal 470 and being at least partially exposed to connect to another electrical connector (e.g., connectors 224 of the controller 200. In some implementations, there is also a flexible seal member 478 for sealing (e.g., from moisture) and retaining member 482 for holding or securing the seal member 478 within the housing 404 of the connector 400. In some implementations, the housing 404 and the cap member 420 are physically connected to each other with force return springs 604 (see FIGS. 9C and 9E-9F) disposed therebetween. In some implementations, the terminals discussed above (e.g., terminals 470, 474) are housed by modular terminal housings 608 with interlocking pin keys and holes 612 and a cable strain relief/seal 616 (see FIG. 9C). FIGS. 9E-9F further illustrate at 650*a* a fully engaged/locked latch assurance feature 654, which blocks latching of the controller 200 unless the connectors are latched and also blocks unlatching of the connectors 200. In 650*b*, a degree of allowable movement 658 (e.g., ~2 mm of Z-axis float) is illustrated and can be achieved via the optional force return springs 604.

Figure 8A:
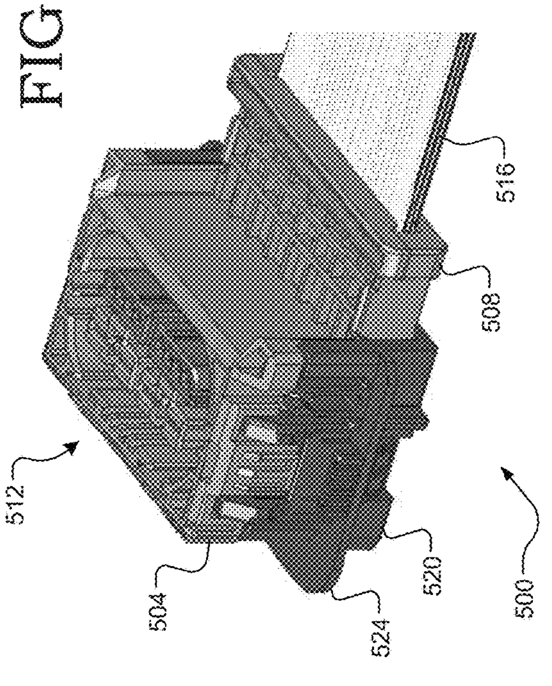
FIGS. 8A-8B are perspective and exploded views of a second example floating electrical connector having a stacked FC configuration according to some implementations of the present disclosure.
Figure 8B:
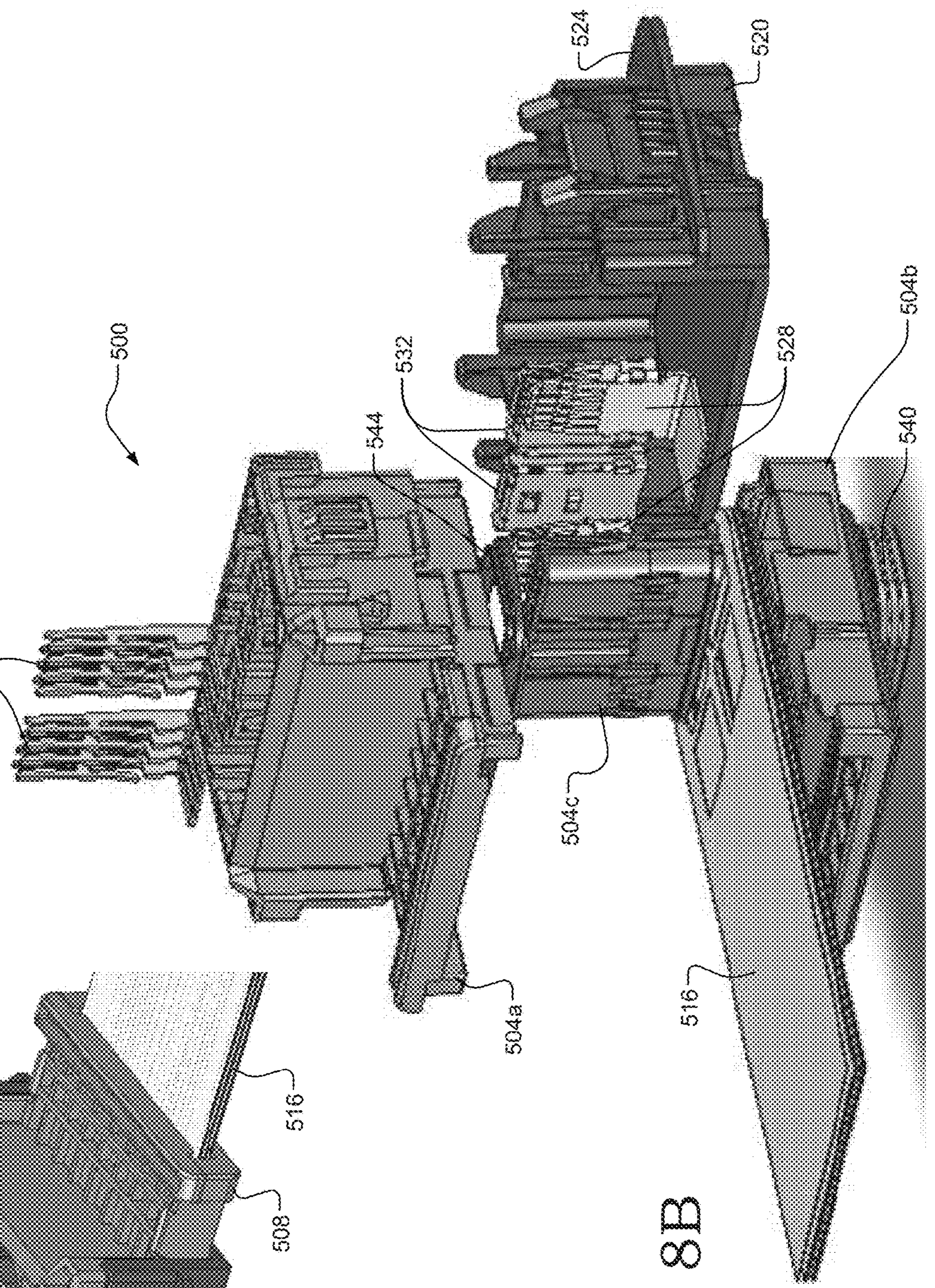
Figure 9G:
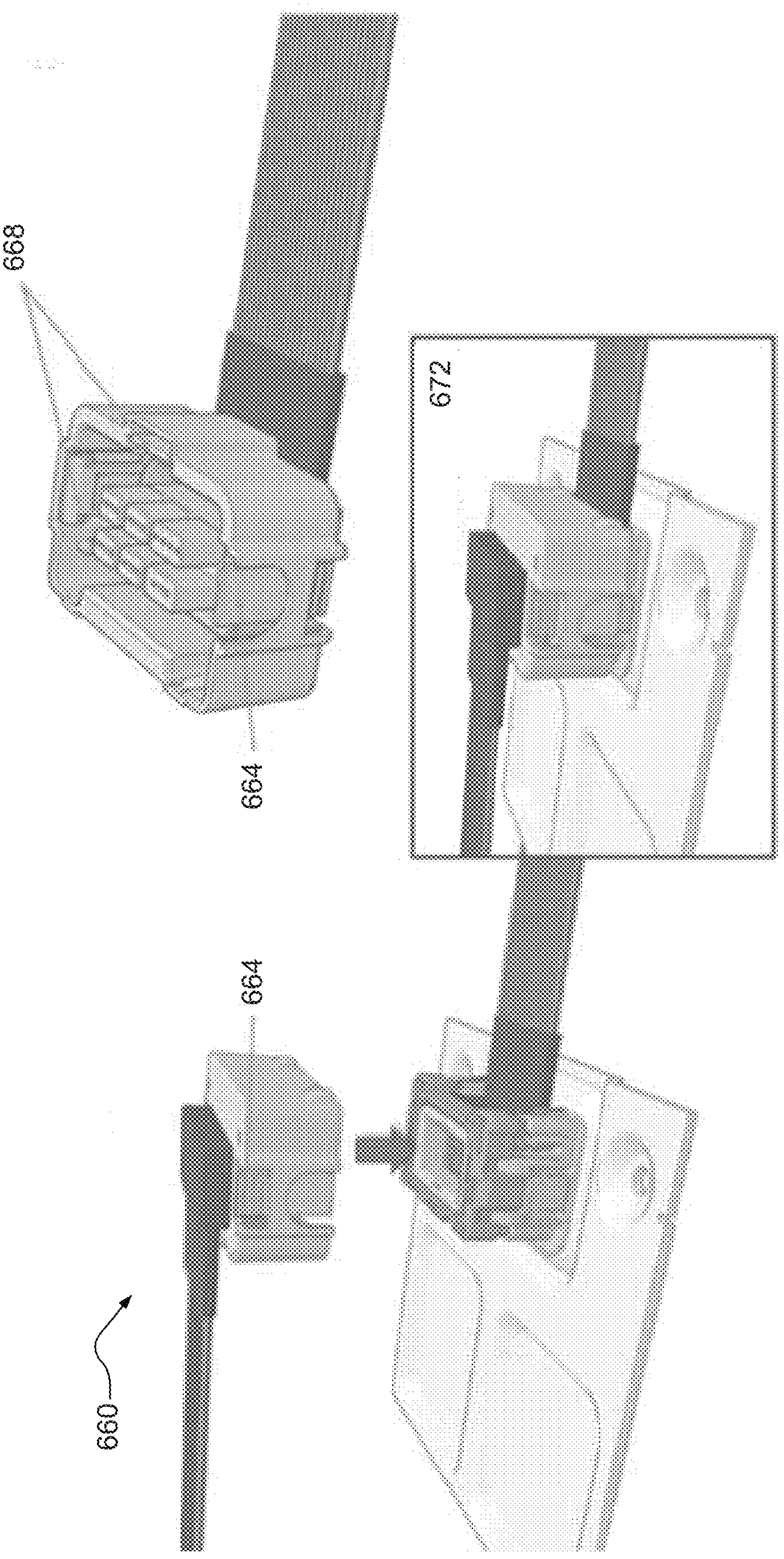
Figure 9H:
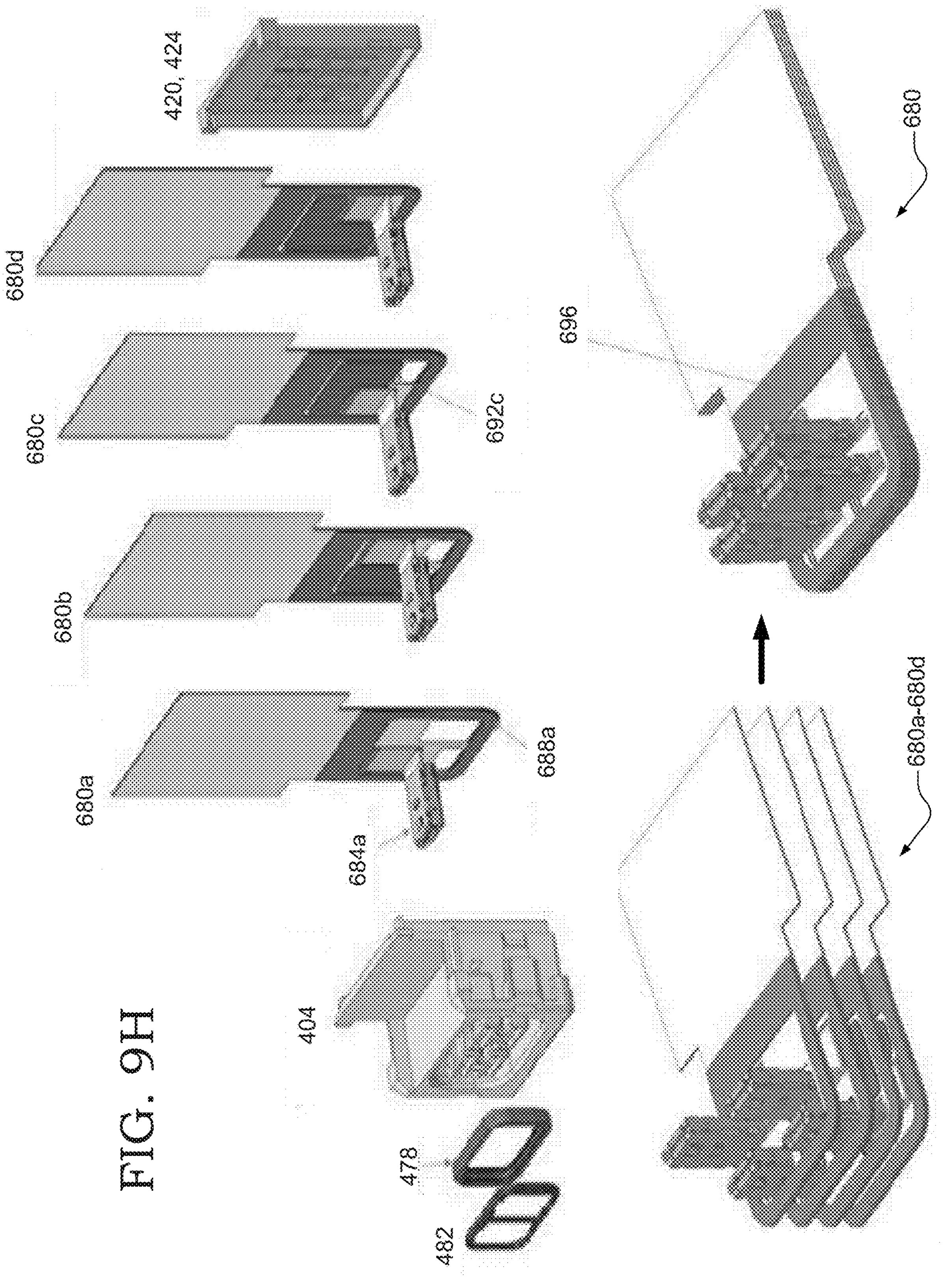

Referring now to FIGS. 8A-8B and with continued reference to the previous FIGS., side and exploded views of a second example floating electrical connector 500 (or "connector 500") having a stacked FC configuration according to some implementations of the present disclosure are illustrated. The connector 500 generally comprises a terminal housing 504 defining a set of CPA features such as those previously described with respect to connector 400. The connector 500 also includes a cap or cover member 520 configured to selectively engage with the terminal housing 504 and thereby form a first connection portion 508. As shown in the exploded view of FIG. 8B, the terminal housing 504 can be generally divided into three portions: a main or upper portion 504*a*, a bottom or lower portion 504*b*, and an intermediate portion 504*c*. Stacked FCs 516 are provided via the first connection portion 508. The connector 500 includes a set of terminals each having a first terminal end 528 for electrically contacting a respective FC 516 and a second terminal end 532 exposed via a second connection portion 512 defined by the terminal housing 504. Another electrical connector, such as the electrical controller electrical connector 224, is configured to connect via this second connection portion 512. It will be appreciated, however, that another electrical connector could connect via this second connection portion 512, such as an in-line connector 660 with a manual thumb release latch 664 and automatic locking/releasing latches 668 (see FIG. 9G). The fully-mated in-line connector 660 with connector 500 is illustrated at 672. In some implementations, the connector 500 further comprises a flexible seal member 540 configured to seal the second connection portion 512 and a rigid retainer member 544 configured to secure the flexible seal member 540 therein the second connection portion 512. FIG. 9H illustrates an exploded view of an example connector configuration having a novel stacking of multiple FCs. As shown, the terminal housing 404 has an optional flexible seal member 478 and optional rigid retainer member 482 at one end and a stack of a plurality of FCs 680*a*-680*d* sandwiched between the terminal housing 404 and the cap member 420, 424. Each of the FCs 680*a*-680*b* includes a respectively terminal (e.g., terminal 684*a*) arranged in a different configuration relative to the others (relative to a gap in each respective adhesive layer (e.g., adhesive layer 688*a*) to allow for stacking. Optional spacers could be implemented to provide for these various configurations (e.g., see spacer 692*c*). The bottom illustrations illustrate the stacking of the distinct FC layers 680*a*-680*d* to form and secure, via the respective adhesive layers 688 and their relative gaps for the terminals 684, a fully-stacked FC assembly 680. As shown, a 2×2 (four-way connector, or 4WC) configuration could be implemented to save space, whereas other configurations are also envisioned such as a ten-way connector (10WC), such as in a 2×5 or 5×2 configuration.

Figure 10A:
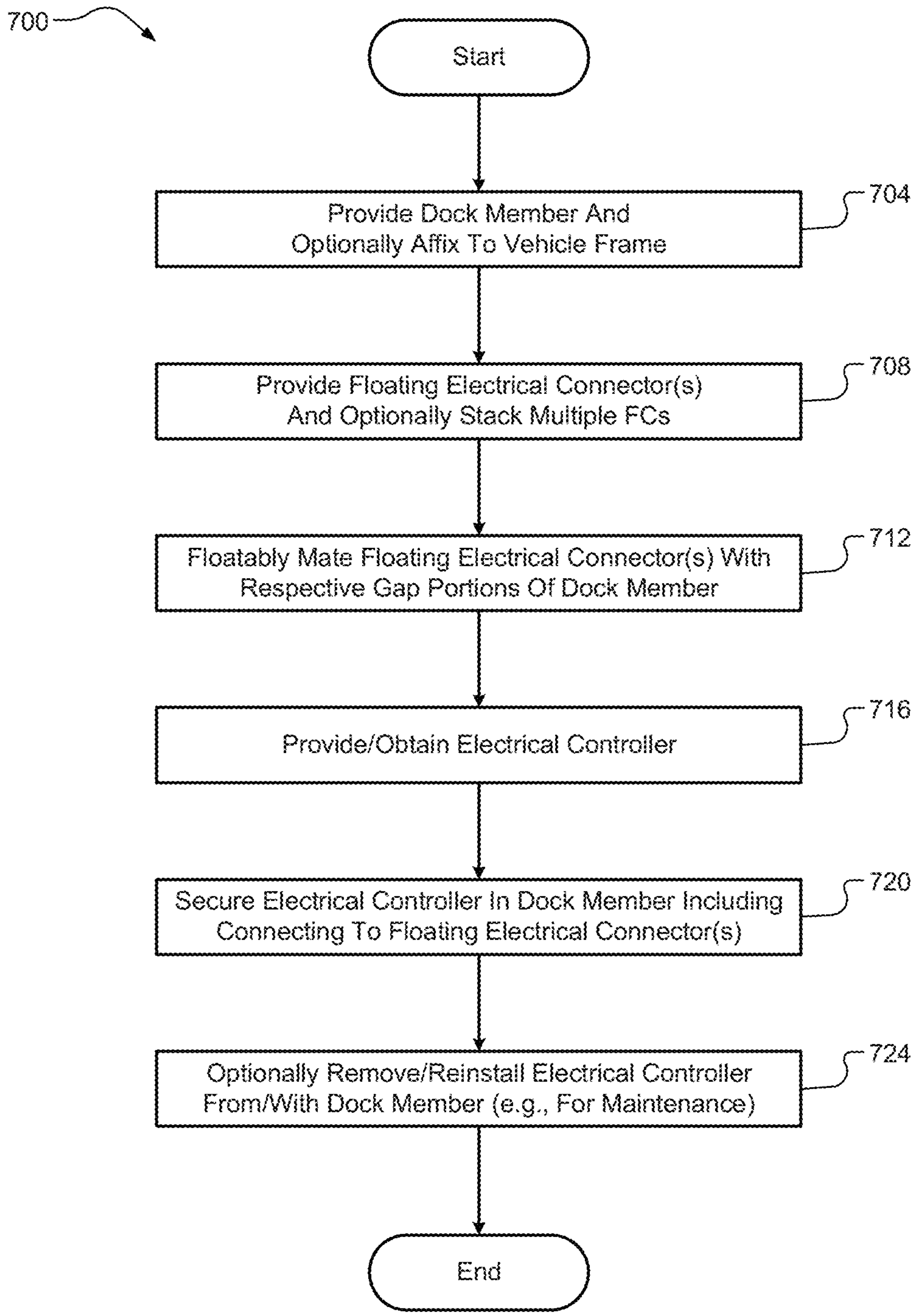
FIGS. 10A-10C are flow diagrams of example manufacturing/assembly and/or (e.g., human and/or robotic) installation methods according to some implementations of the present disclosure.
Figure 10B:
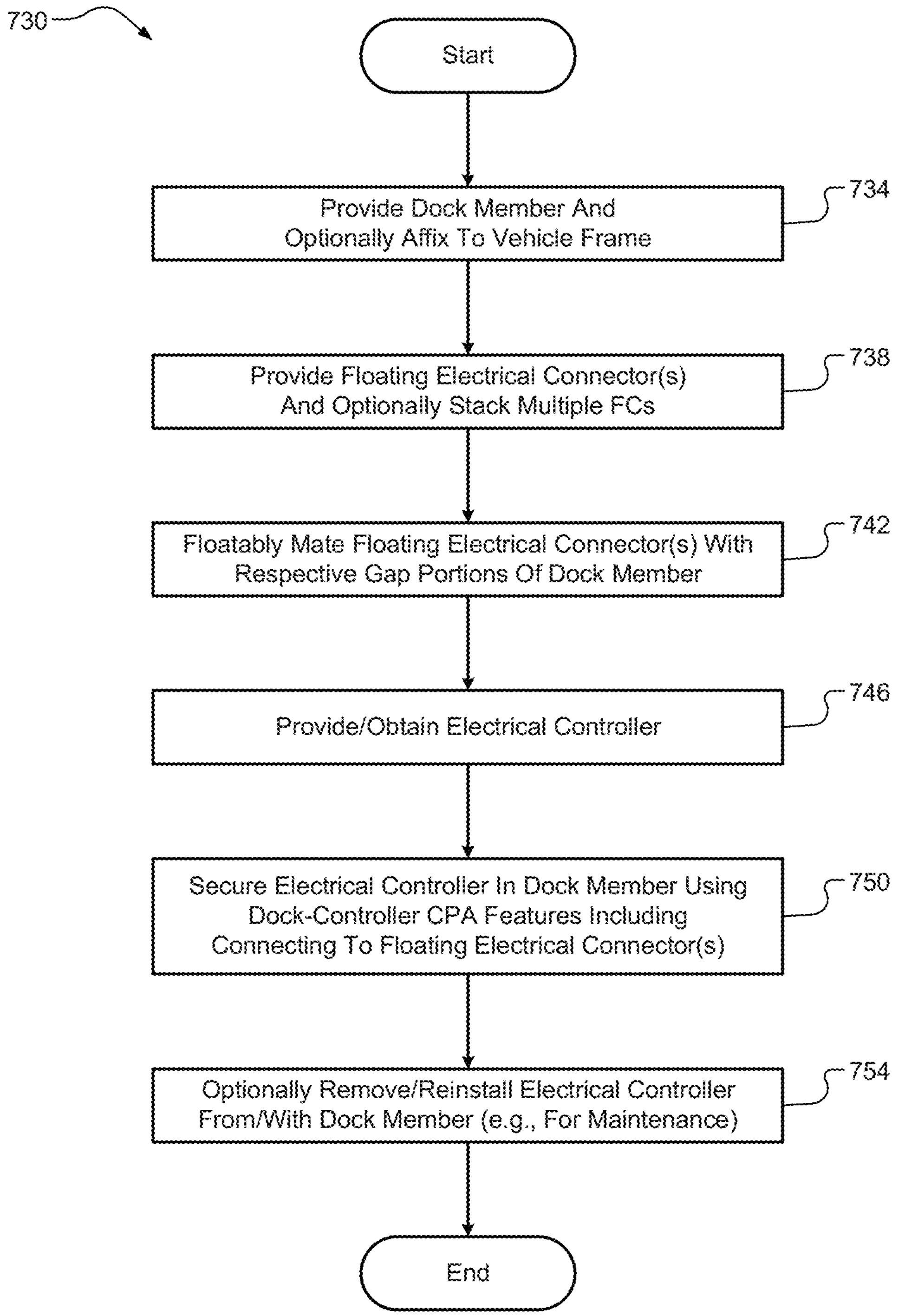
Figure 10C:
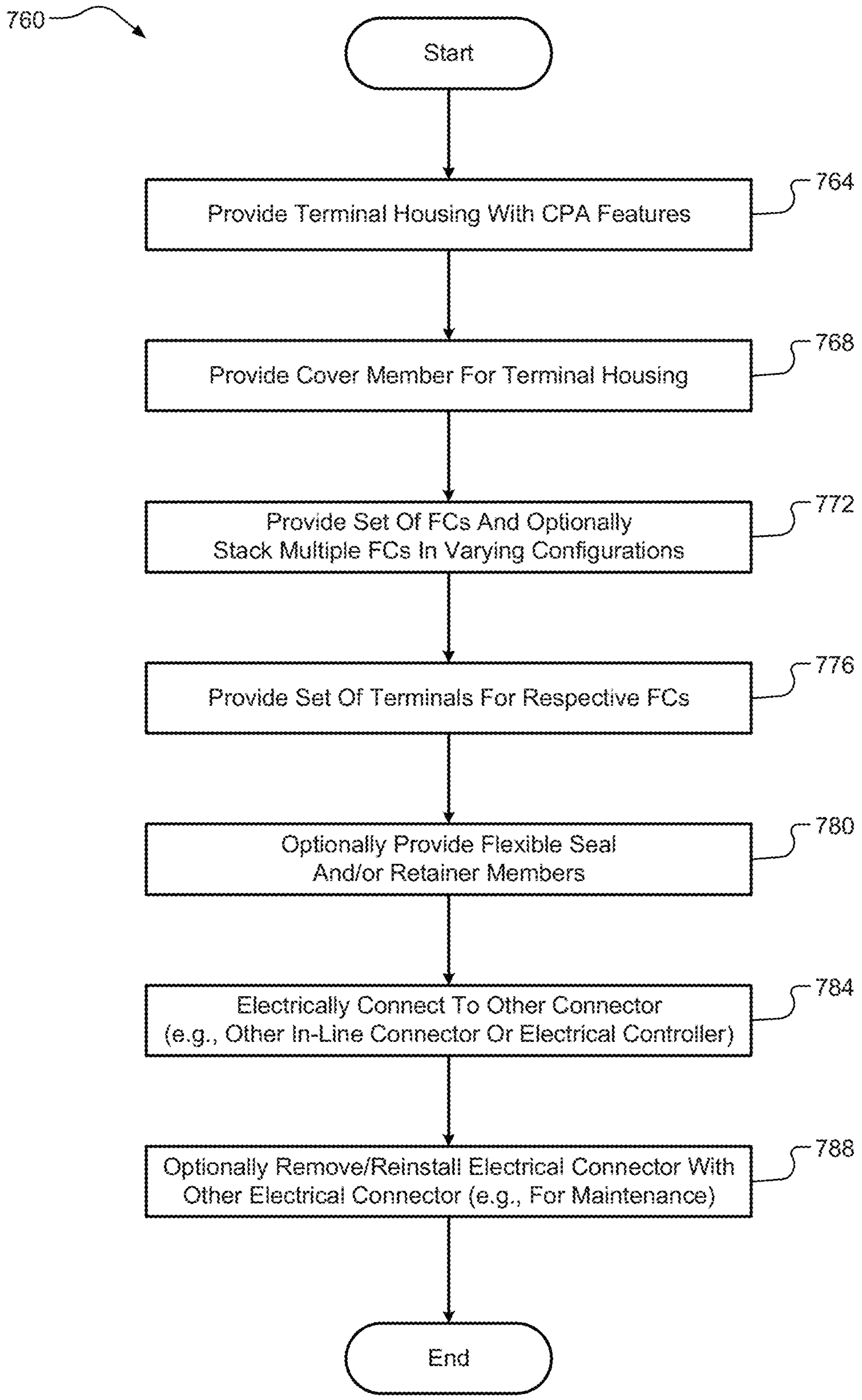

FIGS. 10A-10C are flow diagrams of example manufacturing/assembly and/or (e.g., human and/or robotic) installation methods 700, 730, 760 according to some implementations of the present disclosure are illustrated. In a first method 700 of FIG. 10A, a dock member is initially provided and optionally fixed to the electrified vehicle frame at 704. At 708, at least one floating electrical connector is provided, which could optionally include multiple stacked FCs. At 712, floatable mating of the floating electrical connector(s) with the respective gap areas of the dock member is performed. At 716, an electrical controller is provided or otherwise obtained (e.g., from a third-party). At 720, the controller is secured within the docking member including the simultaneous self-aligning and electrical connection with the floating electrical connector(s). At 724, a final optional removal step could be performed where the controller is removed and optionally then reinstalled from/with the dock member, such as for periodic maintenance. The method 700 then ends or returns to 704. In a second method 730 of FIG. 10B, a dock member is initially provided and optionally fixed to the electrified vehicle frame at 734. At 738, at least one floating electrical connector is provided, which could optionally include multiple stacked FCs. At 742, floatable mating of the floating electrical connector(s) with the respective gap areas of the dock member is performed. At 746, an electrical controller is provided or otherwise obtained (e.g., from a third-party). At 750, the controller is secured within the docking member including the self-aligning of the controller with the dock member using the dock-controller CPA features and simultaneous electrical connection with the floating electrical connector(s). At 754, a final optional removal step could be performed where the controller is removed and optionally then reinstalled from/with the dock member, such as for periodic maintenance. The method 730 then ends or returns to 734. In a third method 760 of FIG. 10C, a terminal housing with CPA features is initially provided at 764. At 768, a cover or cap member for the terminal housing is provided. At 772, a set of FCs is provided, which could optionally include multiple stacked FCs. At 776, a set of respective terminals for the set of FCs is provided. At 780, an optional flexible seal member and optional retainer member for the flexible seal member are provided. At 784, an electrical connection of the connector with another connector is performed, which could be, for example only, another in-line electrical connector or a controller electrical connector. At 788, a final optional removal step could be performed where the other electrical connector is removed and optionally then reinstalled from/with the connector, such as for periodic maintenance. The method 760 then ends or returns to 764.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-aligning mounting system for an electrical controller of an electrified vehicle, the self-aligning mounting system comprising:

- a dock member defining a base portion and four side portions and configured to be fixedly attached to a frame of the electrified vehicle and to at least temporarily secure the electrical controller therein; and
- at least one floating electrical connector:
  - floatably mateable with the dock member such that the floating electrical connector is movable by a tolerance distance amount along each of at least first and second perpendicular axes that are each parallel to the base portion of the dock member; and
  - configured to, during securement of the electrical controller within the dock member along a third axis perpendicular to the first and second axes, electrically connect a first connection portion of the floating electrical connector to a corresponding electrical connector defined in a bottom surface of a housing of the electrical controller,
- wherein each floating electrical connector defines a cap member,
- wherein the dock member base portion and one dock member side portion define at least one gap portion each defining at least one recessed tab structure, and
- wherein the at least one gap portion is configured to receive the at least one floating electrical connector and the cap member of the at least one floating electrical connector is configured to interact with the at least one recessed tab structure.

2. The self-aligning mounting system of claim 1, wherein each floating electrical connector defines a second connection portion that receives at least one flexible circuit (FC) arranged approximately parallel to the dock member base portion, and wherein the second connection portion is arranged approximately perpendicular to the dock member base portion.

3. The self-aligning mounting system of claim 2, wherein at least one second connection portion of at least one floating electrical connector receives a plurality of FCs in a stacked configuration.

4. The self-aligning mounting system of claim 2, wherein each floating electrical connector defines a base housing member, and wherein the cap member is configured to selectively engage/disengage with the base housing member via a set of connection position assurance (CPA) features.

5. The self-aligning mounting system of claim 4, wherein each floating electrical connector further comprises at least one seal or retaining member arranged between the cap member and the base housing member.

6. The self-aligning mounting system of claim 1, wherein each cap member defines a cap member area that is less than an area of the gap portion to thereby allow the floating electrical connector to be movable by the tolerance distance amount along each of at least first and second perpendicular axes.

7. The self-aligning mounting system of claim 6, wherein the dock member provides for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector.

8. The self-aligning mounting system of claim 1, wherein the at least one floating electrical connector comprises distinct first and second floating electrical connectors and the dock member base portion and one of the dock member side portions define distinct first and second gap portions each defining at least one recessed tab structure, wherein the first and second gap portions are configured to receive the first and second floating electrical connectors and respective first and second cap members of the first and second floating electrical connector is configured to interact with the respective at least one recessed tab structures.

9. The self-aligning mounting system of claim 1, wherein the dock member is formed of sheet metal and the sheet metal dock member further comprises heat sinks or heat transfer materials disposed on an inner portion of its bottom surface to provide for heat management of the electrical controller and the sheet metal dock member.

10. A self-aligning mounting method for an electrical controller of an electrified vehicle, the self-aligning mounting method comprising:

providing a dock member defining a base portion and four side portions and configured to be fixedly attached to a frame of the electrified vehicle and to at least temporarily secure the electrical controller therein;

providing at least one floating electrical connector:

floatably mateable with the dock member such that the floating electrical connector is movable by a tolerance distance amount along each of at least first and second perpendicular axes that are each parallel to the base portion of the dock member; and configured to, during securement of the electrical controller within the dock member along a third axis perpendicular to the first and second axes; and securing the electrical controller within the dock member along the third axis including electrically connecting a first connection portion of the floating electrical connector to a corresponding electrical connector defined in a bottom surface of a housing of the electrical controller, wherein each floating electrical connector defines a cap member, wherein the dock member base portion and one dock member side portion define at least one gap portion each defining at least one recessed tab structure, and wherein the at least one gap portion is configured to receive the at least one floating electrical connector and the cap member of the at least one floating electrical connector is configured to interact with the at least one recessed tab structure.

11. The self-aligning mounting method of claim 10, wherein each floating electrical connector defines a second connection portion for receiving at least one flexible circuit (FC) arranged approximately parallel to the dock member base portion, and wherein the second connection portion is arranged approximately perpendicular to the dock member base portion.

12. The self-aligning mounting method of claim 11, wherein at least one second connection portion of at least one floating electrical connector receives a plurality of FCs in a stacked configuration.

13. The self-aligning mounting method of claim 11, wherein each floating electrical connector defines a base housing member, and wherein the cap member is configured to selectively engage/disengage with the base housing member via a set of connection position assurance (CPA) features.

14. The self-aligning mounting method of claim 13, wherein each floating electrical connector further comprises at least one seal or retaining member arranged between the cap member and the base housing member.

15. The self-aligning mounting method of claim 10, wherein each cap member defines a cap member area that is less than an area of the gap portion to thereby allow the floating electrical connector to be movable by the tolerance distance amount along each of at least first and second perpendicular axes.

16. The self-aligning mounting method of claim 15, wherein the dock member provides for a stiff or rigid positioning of the electrical controller therein and the floating electrical connector provides for flexible positioning of the electrical connector within the tolerance distances relative to the corresponding electrical controller connector such that the electrical controller can be physically secured therein the dock member with a proper electrical connection between its electrical connector and the floating electrical connector.

17. The self-aligning mounting method of claim 10, wherein the at least one floating electrical connector comprises distinct first and second floating electrical connectors and the dock member base portion and one of the dock member side portions define distinct first and second gap portions each defining at least one recessed tab structure, wherein the first and second gap portions are configured to receive the first and second floating electrical connectors and respective first and second cap members of the first and second floating electrical connector is configured to interact with the respective at least one recessed tab structures.

18. The self-aligning mounting method of claim 10, wherein the dock member is formed of sheet metal and the sheet metal dock member further comprises heat sinks or heat transfer materials disposed on an inner portion of its bottom surface to provide for heat management of the electrical controller and the sheet metal dock member.

* * * * *